United States Patent
Srinivasa et al.

(10) Patent No.: US 9,118,530 B2
(45) Date of Patent: Aug. 25, 2015

(54) METHODS AND APPARATUS FOR WLAN TRANSMISSION

(71) Applicant: MARVELL WORLD TRADE LTD., St. Michael (BB)

(72) Inventors: Sudhir Srinivasa, Campbell, CA (US); Hongyuan Zhang, Fremont, CA (US); Rohit U. Nabar, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/221,820

(22) Filed: Mar. 21, 2014

(65) Prior Publication Data
US 2014/0205029 A1    Jul. 24, 2014

Related U.S. Application Data

(62) Division of application No. 12/846,681, filed on Jul. 29, 2010, now Pat. No. 8,724,720.

(60) Provisional application No. 61/316,982, filed on Mar. 24, 2010, provisional application No. 61/312,840, (Continued)

(51) Int. Cl.
*H04L 27/28* (2006.01)
*H04L 27/26* (2006.01)
*H04L 1/00* (2006.01)

(52) U.S. Cl.
CPC .......... *H04L 27/2608* (2013.01); *H04L 1/0016* (2013.01)

(58) Field of Classification Search
USPC .......................................... 375/260, 295, 299
See application file for complete search history.

(56) References Cited

U.S. PATENT DOCUMENTS 6,031,874 A * 2/2000 Chennakeshu et al. ....... 375/262
7,346,007 B2    3/2008 Curcio et al.
(Continued)

FOREIGN PATENT DOCUMENTS

EP    1432166 A2    6/2004
EP    1601117 A2    11/2005
(Continued)

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.
(Continued)

*Primary Examiner* — Dac Ha
*Assistant Examiner* — Janice Tieu

(57) ABSTRACT

In a method for generating a PHY data unit for transmission via a communication channel, a modulation scheme is selected from a plurality of modulation schemes, information bits are encoded to generate encoded data using one or more encoders, and an interleaving parameter $N_{COL}$ is selected using the selected modulation scheme. $N_{COL}$ varies for different modulation schemes. The encoded data is interleaved, which includes entering the encoded data into $N_{ROW}$ rows and reading the encoded data out in $N_{COL}$ columns. The payload information of the PHY data unit is modulated according to the modulation scheme, and a plurality of OFDM symbols is formed based on the modulated payload information.

17 Claims, 25 Drawing Sheets

Related U.S. Application Data filed on Mar. 11, 2010, provisional application No. 61/286,948, filed on Dec. 16, 2009, provisional application No. 61/266,453, filed on Dec. 3, 2009, provisional application No. 61/237,215, filed on Aug. 26, 2009, provisional application No. 61/233,445, filed on Aug. 12, 2009, provisional application No. 61/229,679, filed on Jul. 29, 2009.

(56) References Cited

U.S. PATENT DOCUMENTS

| | | |
|---|---|---|
| 7,599,332 B2 | 10/2009 | Zelst et al. |
| 7,742,390 B2 | 6/2010 | Mujtaba |
| 8,144,647 B2 | 3/2012 | Nabar et al. |
| 8,149,811 B2 | 4/2012 | Nabar et al. |
| 8,155,138 B2 | 4/2012 | van Nee |
| 8,270,909 B2 | 9/2012 | Zhang et al. |
| 8,289,869 B2 | 10/2012 | Sawai |
| 8,472,383 B1 | 6/2013 | Banerjea et al. |
| 8,526,351 B2 | 9/2013 | Fischer et al. |
| 8,599,803 B1 | 12/2013 | Zhang et al. |
| 8,619,907 B2 | 12/2013 | Mujtaba et al. |
| 8,660,497 B1 | 2/2014 | Zhang et al. |
| 8,724,546 B2 | 5/2014 | Zhang et al. |
| 8,724,720 B2 | 5/2014 | Srinivasa et al. |
| 8,773,969 B1 | 7/2014 | Zhang et al. |
| 8,873,525 B2 | 10/2014 | Liu et al. |
| 8,885,620 B2 | 11/2014 | Liu et al. |
| 8,886,755 B1 | 11/2014 | Liu et al. |
| 2004/0081073 A1* | 4/2004 | Walton et al. ............. 370/204 |
| 2005/0195733 A1* | 9/2005 | Walton et al. ............. 370/208 |
| 2007/0140100 A1* | 6/2007 | Ouyang et al. ............. 370/203 |
| 2008/0002649 A1 | 1/2008 | Xia et al. |
| 2008/0205648 A1 | 8/2008 | Hanov et al. |
| 2009/0022093 A1 | 1/2009 | Nabar et al. |
| 2009/0022128 A1 | 1/2009 | Nabar et al. |
| 2009/0059877 A1 | 3/2009 | Utsunomiya et al. |
| 2009/0196163 A1 | 8/2009 | Du |
| 2010/0260159 A1 | 10/2010 | Zhang et al. |
| 2010/0322334 A1 | 12/2010 | Wang et al. |
| 2011/0002219 A1 | 1/2011 | Kim et al. |
| 2011/0096796 A1 | 4/2011 | Zhang et al. |
| 2011/0310827 A1 | 12/2011 | Srinivasa et al. |

FOREIGN PATENT DOCUMENTS

| | | |
|---|---|---|
| JP | 2004200923 A | 7/2004 |
| JP | 2005341317 A | 12/2005 |
| JP | 2009055464 A | 3/2009 |
| WO | WO-2008081683 A1 | 7/2008 |
| WO | WO-2009035418 A1 | 3/2009 |

OTHER PUBLICATIONS

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

"IEEE P802.11nTM/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n TM IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., Oct. 2009.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

IEEE Std 802.11n/D8.0, Feb. 2009 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 5: Enhancements for Higher Throughput", *The Institute for Electrical and Electronics Engineers*, pp. i, ii, 258, 260-264, 287, 293, 346-347, 350-351, 354-356 (Feb. 2009).

International Search Report and Written Opinion for International Application No. PCT/US2010/043756 dated Jan. 25, 2011.

International Preliminary Report on Patentability and Written Opinion in corresponding PCT/US2010/043756 dated Jan. 31, 2012.

Office Action for corresponding European Application No. 10 740 806.4 2415, dated Jan. 2, 2013.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Chen, "Home Network Basis: Transmission Environments and Wired/Wireless Protocols," Prentice Hall (Jul. 2003).

Hiertz, et al., "The IEEE 802.11 Universe," IEEE Communications Magazine, pp. 62-70, Jan. 2010.

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Shi et al., "Phase Tracking During VHT-LTF," Doc. No. IEEE 802.11-10/0771r0, *The Institute of Electrical and Electronics Engineers, Inc.*, Jul. 2010.

van Zelst et al., "Pilot Sequence for VHT-DATA," Doc. No. IEEE 802.11-10/0811r1, *The Institute of Electrical and Electronics Engineers, Inc.*, Jul. 2010.

Cariou et al., "Multi-channel Transmissions," Doc. No. IEEE 802.11-09/1022r0, *The Institute of Electrical and Electronics Engineers, Inc.*, Sep. 2009.

Yuan et al., "Carrier Aggregation for LTE-Advanced Mobile Communication Systems," IEEE Communications Magazine, pp. 88-93, Feb. 2010.

Noh, et al., "Channel Selection and Management for 11ac," Doc. No. IEEE 802.11-10/0593r1, *The Institute of Electrical and Electronics Engineers, Inc.*, May 20, 2010.

(56) References Cited

OTHER PUBLICATIONS

U.S. Appl. No. 12/730,651, filed Mar. 24, 2010.
Ho et al., "Final Draft: SDD Text on Downlink MIMO Schemes", IEEE 802.16 Broadband Wireless Access Working Group, Jul. 7, 2008.
Notice of Reasons for Rejection in JP Application No. 2012-523051 dated Feb. 12, 2014.
IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).
IEEE 802.20-PD-06; IEEE P 802.20$^{TM}$V14, Draft 802.20 Permanent Document; <System Requirements for IEEE 802.20 Mobile Broadband Wireless Access Systems—Version 14>, 24 pages (Jul. 16, 2004).
van Nee, et al. "The 802.11n MIMO-OFDM Standard for Wireless LAN and Beyond," Wireless Personal Communications, vol. 37, pp. 445-453 (Jun. 2006).
First Office Action in Chinese Application No. 201080033454.9, dated Feb. 17, 2014, with English translation (26 pages).
Invitation to Pay Fees and Partial International Search Report for International Application No. US2010/043756, dated Nov. 18, 2010 (9 pages).

\* cited by examiner

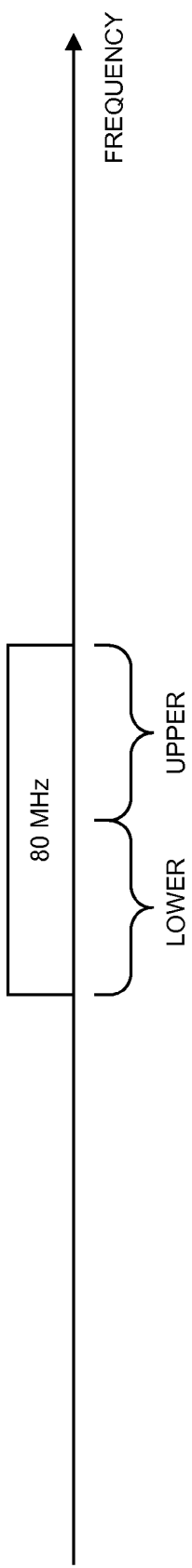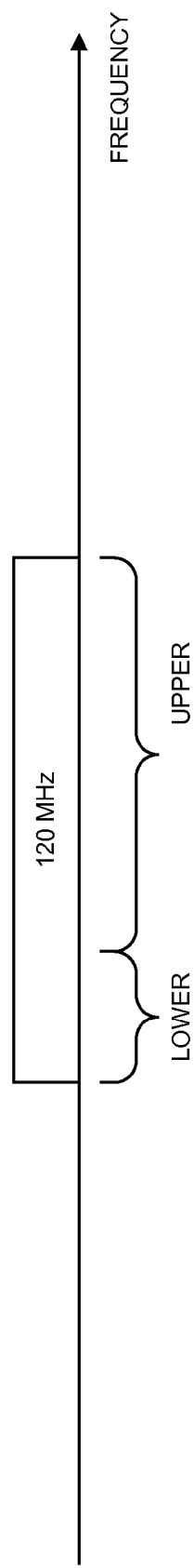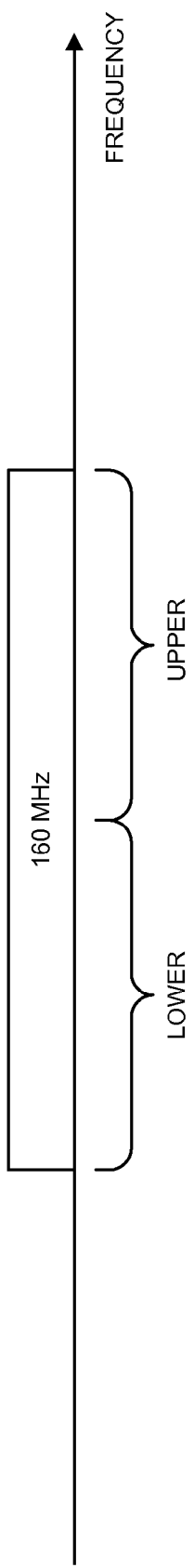

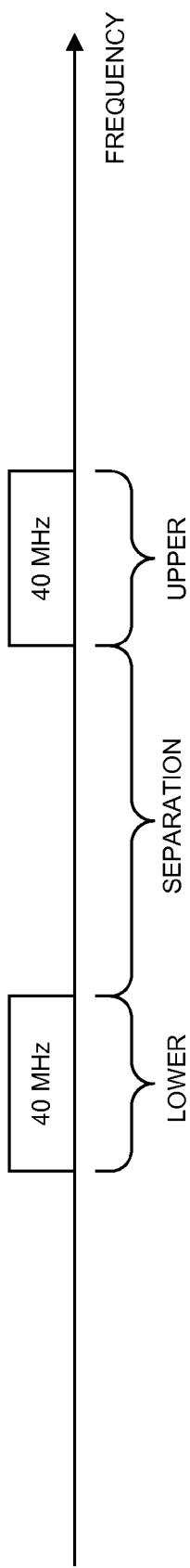
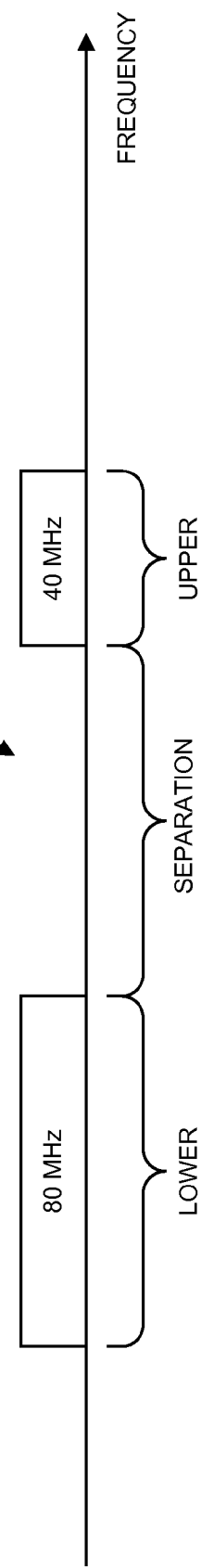
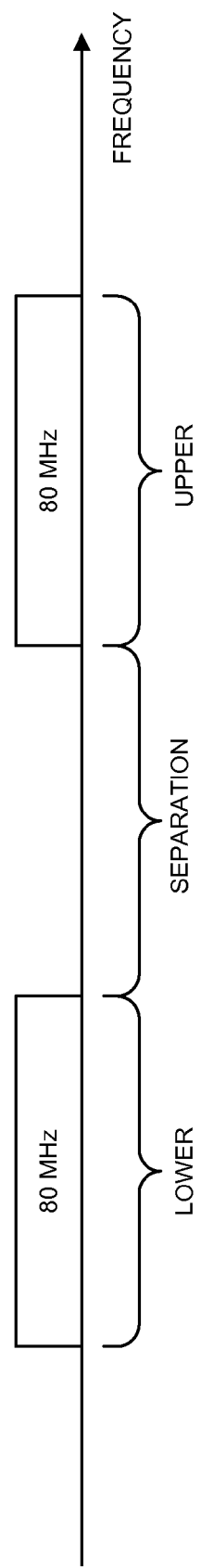
FIG. 4D
FIG. 4E
FIG. 4F

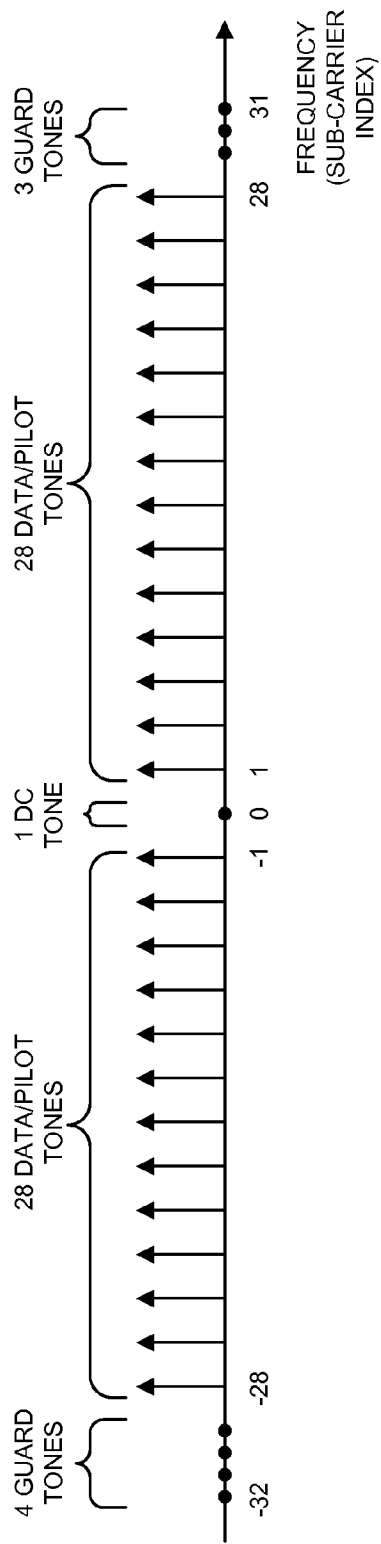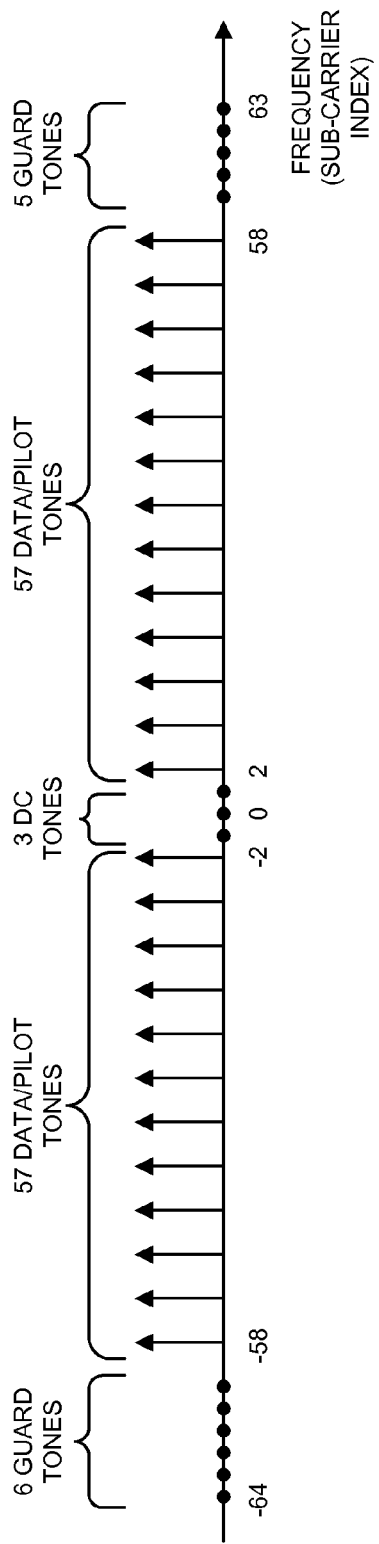
FIG. 5A
FIG. 5B

| | 11a 20MHz | 11n 20MHz | 11n 40MHz | 11ac 80MHz Example 1 | 11ac 80MHz Example 2 | 11ac 80MHz Example 3 | 11ac 80MHz Example 4 |
|---|---|---|---|---|---|---|---|
| # Guard Tones | 11 | 7 | 11 | (4 + 3) = 7 | (4 + 3) = 7 | (5 + 6) = 11 | (5 + 6) = 11 |
| # DC null tones | 1 | 1 | 3 | 3 | 3 | 3 | 3 |
| # Pilot Tones | 4 | 4 | 6 | 8 | 10 | 8 | 10 |
| # Data Tones ($N^{Tone}_{VHT-Data}$) | 48 | 52 | 108 | 238 | 236 | 234 | 232 |
| # Rows, # Columns ($N_{ROW}$, $N_{COL}$) | (3 $N_{BPSCS}(i)$, 16) | (4 $N_{BPSCS}(i)$, 13) | (6 $N_{BPSCS}(i)$, 18) | (14 $N_{BPSCS}(i)$, 17) (17 $N_{BPSCS}(i)$, 14) | (4 $N_{BPSCS}(i)$, 59) (59 $N_{BPSCS}(i)$, 4) | (39 $N_{BPSCS}(i)$, 6) (6 $N_{BPSCS}(i)$, 39) (9 $N_{BPSCS}(i)$, 26) (26 $N_{BPSCS}(i)$, 9) (18 $N_{BPSCS}(i)$, 13) (13 $N_{BPSCS}(i)$, 18) (2 $N_{BPSCS}(i)$, 117) (3 $N_{BPSCS}(i)$, 78) | (8 $N_{BPSCS}(i)$, 29) (29 $N_{BPSCS}(i)$, 8) (4 $N_{BPSCS}(i)$, 58) (58 $N_{BPSCS}(i)$, 4) |
| # Rotations ($N_{ROT}$) | N.A. | 11 | 29 | 59 | 58 | 59 | 59 |

FIG. 16

| $i_{SS}$ | 5 streams ($N_{ROT}$=46) | 6 streams ($N_{ROT}$=39) | 7 streams ($N_{ROT}$=33) | 8 streams ($N_{ROT}$=29) |
|---|---|---|---|---|
| 1 | 0 | 0 | 0 | 0 |
| 2 | $3 * N_{BPSCS}(i_{SS}) * (46)$ | $3 * N_{BPSCS}(i_{SS}) * (39)$ | $3 * N_{BPSCS}(i_{SS}) * (33)$ | $3 * N_{BPSCS}(i_{SS}) * (29)$ |
| 3 | $1 * N_{BPSCS}(i_{SS}) * (46)$ | $1 * N_{BPSCS}(i_{SS}) * (39)$ | $6 * N_{BPSCS}(i_{SS}) * (33)$ | $6 * N_{BPSCS}(i_{SS}) * (29)$ |
| 4 | $4 * N_{BPSCS}(i_{SS}) * (46)$ | $4 * N_{BPSCS}(i_{SS}) * (39)$ | $1 * N_{BPSCS}(i_{SS}) * (33)$ | $1 * N_{BPSCS}(i_{SS}) * (29)$ |
| 5 | $2 * N_{BPSCS}(i_{SS}) * (46)$ | $2 * N_{BPSCS}(i_{SS}) * (39)$ | $4 * N_{BPSCS}(i_{SS}) * (33)$ | $4 * N_{BPSCS}(i_{SS}) * (29)$ |
| 6 | - N.A | $5 * N_{BPSCS}(i_{SS}) * (39)$ | $2 * N_{BPSCS}(i_{SS}) * (33)$ | $7 * N_{BPSCS}(i_{SS}) * (29)$ |
| 7 | - N.A | - N.A | $5 * N_{BPSCS}(i_{SS}) * (33)$ | $2 * N_{BPSCS}(i_{SS}) * (29)$ |
| 8 | - N.A | - N.A | - N.A | $5 * N_{BPSCS}(i_{SS}) * (29)$ |

METHODS AND APPARATUS FOR WLAN TRANSMISSION

CROSS-REFERENCES TO RELATED APPLICATIONS

This is a divisional of U.S. patent application Ser. No. 12/846,681, entitled "Method and Apparatus for WLAN Transmission" and filed on Jul. 29, 2010, which claims the benefit of the following U.S. Provisional Patent Applications:

U.S. Provisional Patent Application No. 61/229,679, entitled "Transmitter Flow for 80 MHz OFDM," filed on Jul. 29, 2009;

U.S. Provisional Patent Application No. 61/233,445, entitled "Transmitter Flow for 80 MHz OFDM," filed on Aug. 12, 2009;

U.S. Provisional Patent Application No. 61/237,215, entitled "Transmitter Flow for 80 MHz OFDM," filed on Aug. 26, 2009;

U.S. Provisional Patent Application No. 61/266,453, entitled "Transmitter Flow for 80 MHz OFDM," filed on Dec. 3, 2009;

U.S. Provisional Patent Application No. 61/286,948, entitled "Transmitter Flow for 80/120/160 MHz OFDM," filed on Dec. 16, 2009;

U.S. Provisional Patent Application No. 61/312,840, entitled "Transmitter Flow for 80/120/160 MHz OFDM," filed on Mar. 11, 2010; and U.S. Provisional Patent Application No. 61/316,982, entitled "Transmitter Flow for 80/120/160 MHz OFDM," filed on Mar. 24, 2010.

The disclosures of all of the above-referenced patent applications are hereby incorporated by reference herein.

FIELD OF THE DISCLOSURE

The present disclosure relates generally to communication networks and, more particularly, to wireless local area networks that utilize orthogonal frequency division multiplexing (OFDM).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In one embodiment, a method, implemented in a communication device, for generating a physical layer (PHY) data unit for transmission via a communication channel includes selecting, in the communication device, a modulation scheme from a plurality of modulation schemes, encoding, in the communication device, information bits to generate encoded data using one or more encoders, and selecting, in the communication device, an interleaving parameter $N_{COL}$ using the selected modulation scheme. $N_{COL}$ varies for different modulation schemes. The method also includes interleaving, in the communication device, the encoded data, including entering the encoded data into $N_{ROW}$ rows and reading the encoded data out in $N_{COL}$ columns. The method also includes modulating, in the communication device, the payload information of the PHY data unit according to the modulation scheme, and forming, in the communication device, a plurality of OFDM symbols based on the modulated payload information.

In another embodiment, a PHY apparatus for generating a PHY data unit for transmission via a communication channel includes a memory configured to store indicators of a plurality of modulation schemes. The PHY apparatus is configured to (i) select a modulation scheme from the plurality of modulation schemes, and (ii) select an interleaving parameter $N_{COL}$ using the selected modulation scheme, where $N_{COL}$ varies for different modulation schemes. The PHY apparatus further includes one or more encoders configured to encode information bits to generate encoded data, an interleaver configured to interleave the encoded data, including entering the encoded data into $N_{ROW}$ rows and reading the encoded data out in $N_{COL}$ columns, and one or more modulators configured to modulate the encoded information bits according to the selected modulation scheme. The PHY apparatus is configured to form a plurality of OFDM symbols based on the modulated encoded information bits.

In another embodiment, a tangible, non-transitory, computer-readable medium stores instructions that, when executed by one or more processors, cause the one or more processors to select a modulation scheme from a plurality of modulation schemes, encode information bits to generate encoded data using one or more encoders, and select an interleaving parameter $N_{COL}$ using the selected modulation scheme. $N_{COL}$ varies for different modulation schemes. The instructions, when executed by one or more processors, also cause the one or more processors to interleave the encoded data, including entering the encoded data into $N_{ROW}$ rows and reading the encoded data out in $N_{COL}$ columns, modulate the payload information of the PHY data unit according to the modulation scheme, and form a plurality of OFDM symbols based on the modulated payload information.

BRIEF DESCRIPTION OF THE DRAWINGS

FIGS. 4A-4F are diagrams of various example communication channels via which the PHY unit of FIG. 3 is configured to transmit orthogonal frequency division multiplexing (OFDM) symbols, according to various embodiments;

FIGS. 5A and 5B are diagrams of two example OFDM symbols for 40 MHz communication channels that the PHY unit of FIG. 3 is configured to generate, according to an embodiment;

FIGS. 9A and 9B are tables of example pilot symbol values for different scenarios, according to some embodiments;

FIG. 15 is a table providing some example parameter values for an interleaver of the PHY unit of FIG. 3, according to one embodiment;

FIG. 16 is a table providing other example parameter values for the interleaver of the PHY unit of FIG. 3, according to another embodiment;

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. In one embodiment, the first communication protocol is the IEEE 802.11ac Standard, now in the process of being standardized. In other embodiments, the first communication protocol is a protocol other than the IEEE 802.11ac Standard. In some embodiments or scenarios, one or more client stations in the vicinity of the AP are not configured to operate according to the first communication protocol, but are configured to operate according to at least a second communication protocol. Therefore, in some embodiments, the AP is additionally configured to operate with client stations according to at least a second communication protocol.

Figure 1:
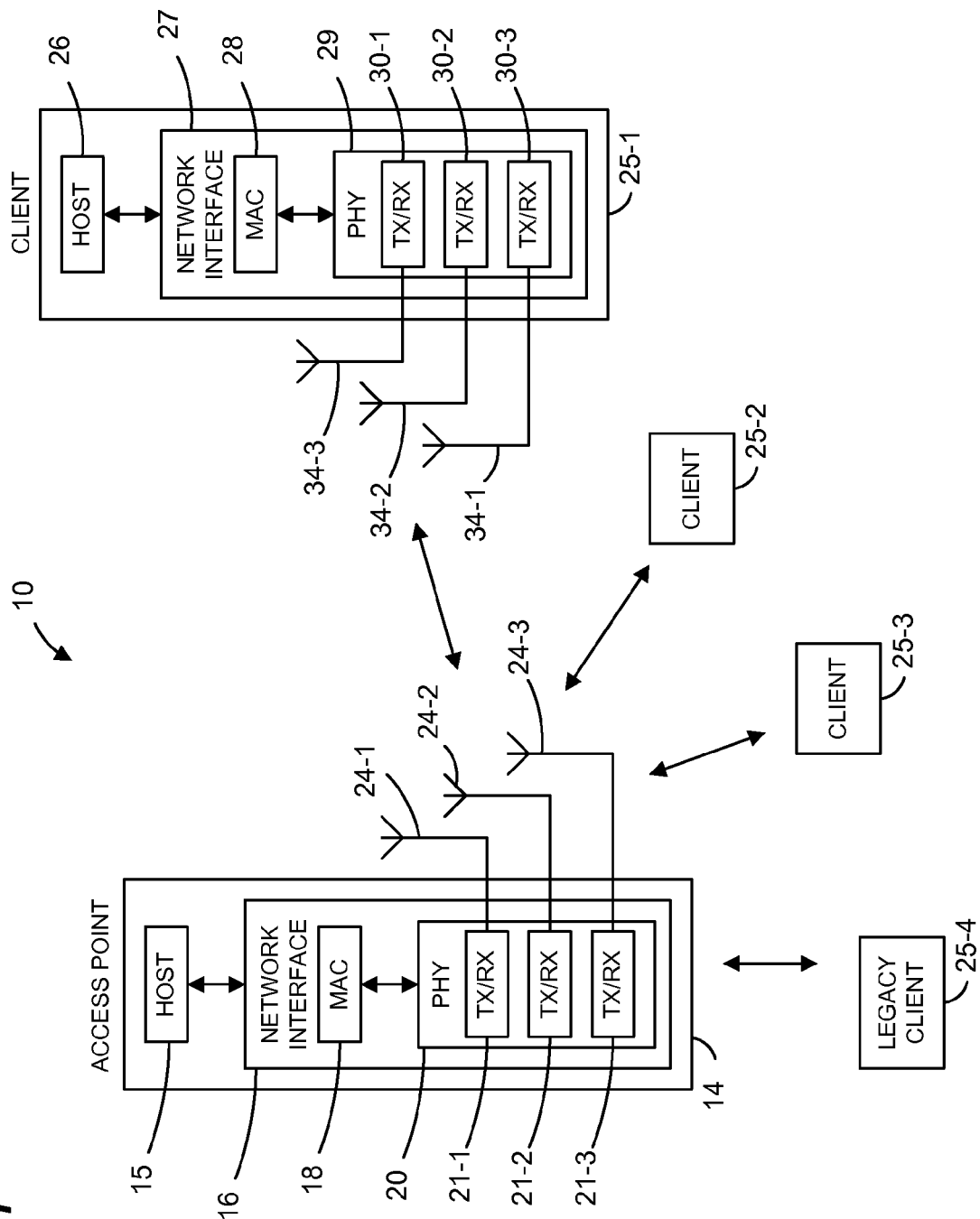
FIG. 1 is a block diagram of an example wireless local area network (WLAN) 10, according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a physical layer (PHY) unit 20. The PHY unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC unit 18 and the PHY unit 20 are configured to operate according to a first communication protocol (e.g., the IEEE 802.11ac Standard, now in the process of being standardized). In another embodiment, the MAC unit 18 and the PHY unit 20 are also configured to operate according to at least a second communication protocol (e.g., the IEEE 802.11n Standard, the IEEE 802.11a Standard, etc.).

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least the second communication protocol (referred to herein as a "legacy client station").

The client station 25-1 includes a host processor 26 coupled to a network interface 27. The network interface 27 includes a MAC unit 28 and a PHY unit 29. The PHY unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or both of the client stations 25-2 and 25-3, has a structure the same as or similar to the client station 25-1. In an embodiment, the client station 25-4, has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol.

In various embodiments, the PHY unit 20 of the AP 14 is configured to generate data units conforming to the first communication protocol. The transceiver(s) 21 is/are configured to transmit the generated data units via the antenna(s) 24.

Similarly, the transceiver(s) 24 is/are configured to receive the data units via the antenna(s) 24. The PHY unit 20 of the AP 14 is configured to process received data units conforming to the first communication protocol, according to an embodiment.

In various embodiments, the PHY unit 29 of the client device 25-1 is configured to generate data units conforming to the first communication protocol. The transceiver(s) 30 is/are configured to transmit the generated data units via the antenna(s) 34. Similarly, the transceiver(s) 30 is/are configured to receive data units via the antenna(s) 34. The PHY unit 29 of the client device 25-1 is configured to process received data units conforming to the first communication protocol, according to an embodiment.

Figure 2:
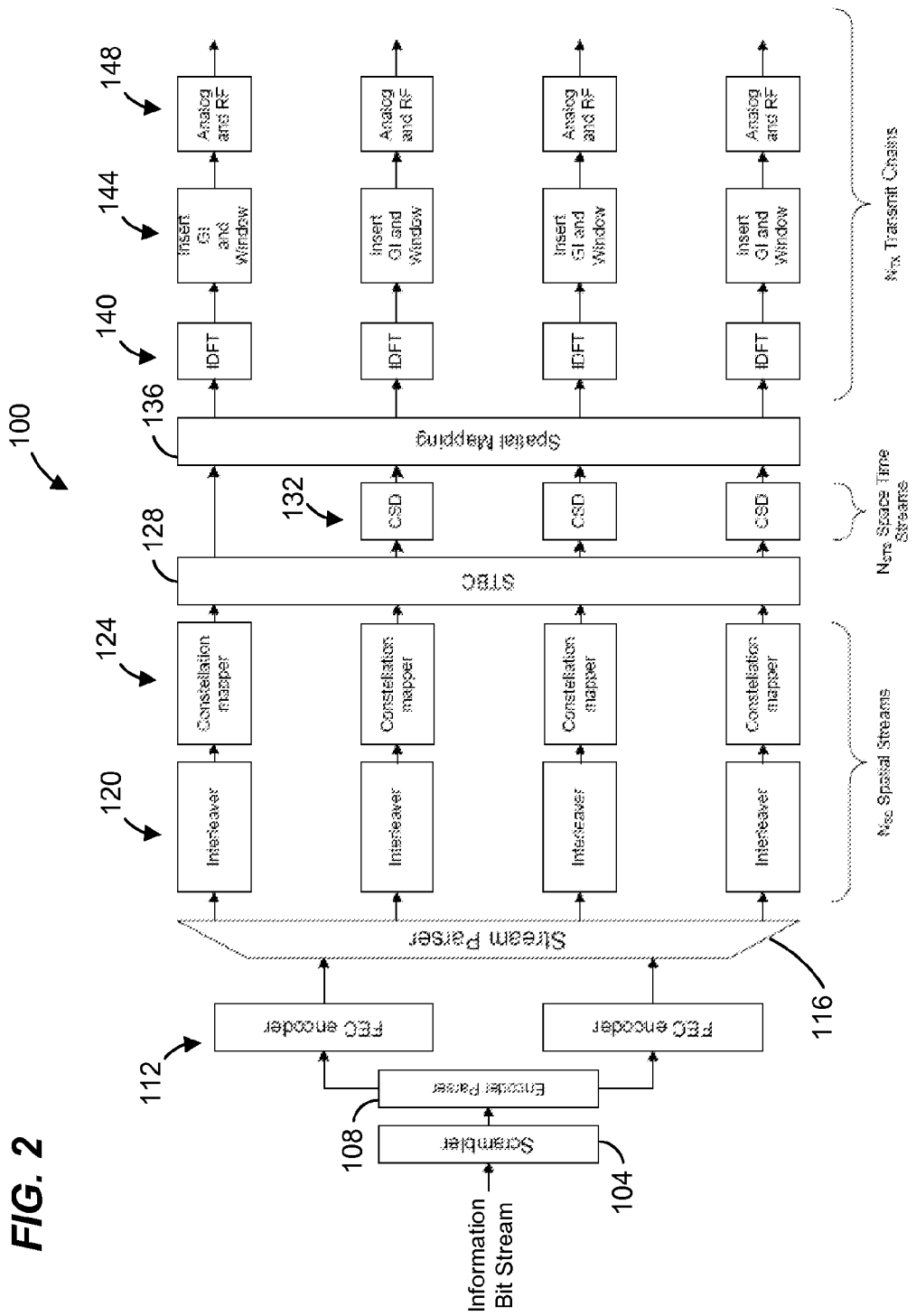
FIG. 2 is a block diagram of a prior art physical layer (PHY) unit.

FIG. 2 is a block diagram of a prior art PHY unit 100 configured to operate according to the IEEE 802.11n Standard. The PHY unit 100 is included in the legacy client 25-4 (FIG. 1), in one embodiment. The PHY unit 100 includes a scrambler 104 that generally scrambles an information bit stream to reduce the occurrence of long sequences of ones or zeros and to generate a scrambled stream. An encoder parser 108 demultiplexes the scrambled stream into one or two encoder input streams corresponding to one or two forward error correction (FEC) encoders 112. Each encoder 112 encodes the corresponding input stream to generate a corresponding encoded stream.

A stream parser 116 parses the one or two encoded streams into up to four spatial streams. Corresponding to each spatial stream, an interleaver 120 interleaves bits of the spatial stream (i.e., changes the order of the bits) to prevent long sequences of adjacent noisy bits from entering a decoder at the receiver. Also corresponding to each spatial stream, a constellation mapper 124 maps an interleaved sequence of bits to constellation points corresponding to different subcarriers of an orthogonal frequency division multiplexing (OFDM) symbol.

A space-time block coding unit 128 receives the constellation points corresponding to the one or more spatial streams and spreads the spatial streams to a greater number of space-time streams. The space-time block coding unit 128 can be controlled to merely pass through spatial streams without performing space-time block coding. For example, when the number of spatial streams is four, the space-time block coding unit 128 does not perform space-time block coding.

A plurality of cyclic shift diversity (CSD) units 132 insert cyclic shifts into all but one of the space-time streams (if more than one space-time stream). The cyclic shifts are to prevent unintentional beamforming.

A spatial mapping unit 136 maps the space-time streams to transmit chains. Spatial mapping may include: 1) direct mapping, in which constellation points from each space-time stream are mapped directly onto transmit chains (i.e., one-to-one mapping); 2) spatial expansion, in which vectors of constellation point from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains.

Each output of the spatial mapping unit 136 corresponds to a transmit chain, and each output of the spatial mapping unit 136 is operated on by an inverse discrete Fourier transform (IDFT) unit 140 that converts a block of constellation points to a time-domain signal.

Outputs of the IDFT units 140 are provided to guard interval (GI) insertion and windowing units 144 that prepends, to an OFDM symbol, a circular extension of the OFDM symbol and smooths the edges of each symbol to increase spectral decay. Outputs of the GI insertion and windowing units 144 are provided to analog and radio frequency (RF) units that convert the signals to analog signals and upconvert the signals to RF frequencies for transmission. The IEEE 802.11n Standard specifies that signals are transmitted in either a 20 MHz bandwidth channel or a 40 MHz bandwidth channel.

Referring again to FIG. 1, the AP 14 and the clients 25-1, 25-2, 25-3 are configured to transmit and receive signals that conform to the first communication protocol. In some embodiments, the first communication protocol permits transmission in a channel having a bandwidth of at least 80 MHz. For instance, in some embodiments, the first communication protocol permits transmission in a channel having a bandwidth of 80 MHz, 120 MHz, 160 MHz, etc. In some embodiments, the first communication protocol permits transmission with different bandwidths such as two or more of 80 MHz, 120 MHz, 160 MHz, etc.

Additionally, in some embodiments, the first communication protocol is generally backwards compatible with older communication protocols, such as one or both of the IEEE 802.11a Standard and the IEEE 802.11n Standard. For example, in one embodiment, the first communication protocol specifies a PHY data unit format such as one or more of the formats in U.S. patent application Ser. No. 12/758,603, filed on Apr. 12, 2010, and entitled "Physical Layer Frame Format", which is hereby incorporated by reference herein, in its entirety.

Figure 3:
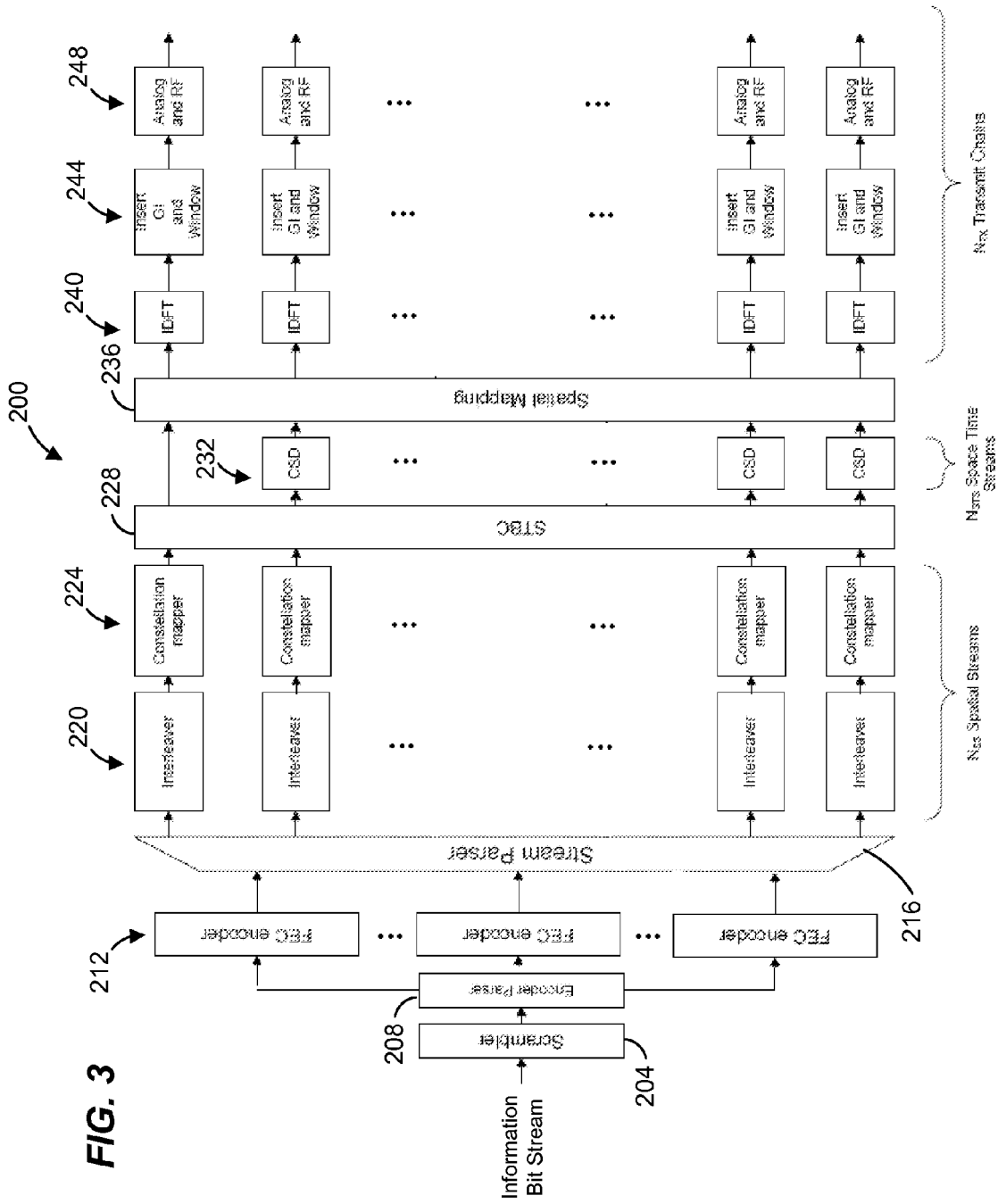
FIG. 3 is a block diagram of a PHY unit, according to an embodiment.

FIG. 3 is a block diagram of an example PHY unit 200 configured to operate according to the first communication protocol, according to an embodiment. Referring to FIG. 1, the AP 14 and the client station 25-1, in one embodiment, each include a PHY unit such as the PHY unit 200.

The PHY unit 200 includes a scrambler 204 that generally scrambles an information bit stream to reduce the occurrence of long sequences of ones or zeros. The IEEE 802.11a Standard and the 802.11n Standard specify a 127-length scrambler with a generator polynomial S(x) given by:

$$S(x)=x^7+x^4+1 \qquad \text{Equ. 1}$$

The polynomial S(x) is also utilized for descrambling an information bit stream at the receiver. In one embodiment, the scrambler 204 implements a 127-length scrambler with a generator polynomial S(x) given by Equ. 1. Also in this embodiment, a receiver configured to operate according to the first communication protocol also utilizes the generator polynomial S(x) given by Equ. 1. In other embodiments, the scrambler 204 implements a length different than 127 and/or utilizes a generator polynomial different than the generator polynomial S(x) given by Equ. 1. In another embodiment, the scrambler 204 is replaced with a plurality of parallel scramblers located after an encoder parser 208. In this embodiment, each of the parallel scramblers has a respective output coupled to a respective one of a plurality of FEC encoders 212. The plurality of parallel scramblers operate simultaneously on a demultiplexed stream. In another embodiment, the scrambler 204 comprises a plurality of parallel scramblers and a demultiplexer that demultiplexes the information bit stream to the plurality of parallel scramblers, which operate simultaneously on demultiplexed streams. These embodiments may be useful, in some scenarios, to accommodate wider bandwidths and thus higher operating clock frequencies.

The encoder parser 208 is coupled to the scrambler 204. The encoder parser 208 demultiplexes the information bit stream into one or more encoder input streams corresponding to one or more FEC encoders 212. In another embodiment with a plurality of parallel scramblers, the encoder parser 208 demultiplexes the information bit stream into a plurality of streams corresponding to the plurality of parallel scramblers.

Each encoder 212 encodes the corresponding input stream to generate a corresponding encoded stream. In one embodiment, each FEC encoder 212 includes a binary convolutional encoder. In another embodiment, each FEC 212 encoder includes a binary convolutional encoder followed by a puncturing block. In another embodiment, each FEC encoder 212 includes a low density parity check (LDPC) encoder. In another embodiment, each FEC encoder 212 includes a binary convolutional encoder followed by a puncturing block. In yet another embodiment, each FEC encoder 212 additionally includes an LDPC encoder. In this embodiment, each FEC encoder 212 is configured to implement any of: 1) binary convolutional encoding without puncturing; 2) binary convolutional encoding with puncturing; or 3) LDPC encoding.

Different numbers of encoders 212 may operate in parallel depending on the data rate of a particular modulation coding scheme (MCS). In one embodiment, the PHY unit 200 includes five encoders 212, and one, two, three, four, or five encoders operate simultaneously depending on the particular MCS being utilized. In another embodiment, the PHY unit 200 includes four encoders 212, and one, two, three, or four encoders operate simultaneously depending on the particular MCS being utilized. In another embodiment, the PHY unit 200 includes four encoders 212, and one, two, or four encoders operate simultaneously depending on the particular MCS being utilized. In another embodiment, the PHY unit 200 includes three encoders 212, and one, two, or three encoders operate simultaneously depending on the particular MCS being utilized. In another embodiment, the PHY unit 200 includes up to eight encoders 212, and one, two, three, four, five, six, seven, or eight encoders operate simultaneously depending on the particular MCS being utilized. In another embodiment, the PHY unit 200 includes up to eight encoders 212, and one, two, three, four, six, or eight encoders operate simultaneously depending on the particular MCS being utilized. In another embodiment, the PHY unit 200 includes up to eight encoders 212, and one, two, four, six, or eight encoders operate simultaneously depending on the particular MCS being utilized.

In one embodiment, the number of encoders utilized increments according 450 Mbps step sizes in the data rate. In other embodiments, the number of encoders utilized increments according to a step size in the data rate that is between approximately 400 and 500 Mbps. In another embodiment, the number of encoders utilized increments according to a step size in the data rate that is between approximately 400 and 600 Mbps. In one embodiment, the step size is 600 Mbps.

A stream parser 216 parses the one or more encoded streams into one or more spatial streams for separate interleaving and mapping into constellation points. In one embodiment, the stream parser 216 uses the output of each operating encoder 212 in a round robin fashion, using S bits from each operating encoder per cycle, where:

$$S = \sum_{i=1}^{N_{SS}} \max\left\{1, \frac{N_{BPSCS}(i_{SS})}{2}\right\},$$ Equ. 2 and where $N_{SS}$ is the number of spatial streams and $N_{BPSCS}(i_{SS})$ is the number of coded bits per carrier for spatial stream $i_{SS}$.

Corresponding to each spatial stream, an interleaver 220 interleaves bits of the spatial stream (i.e., changes the order of the bits) to prevent long sequences of adjacent noisy bits from entering a decoder at the receiver. Compared to the interleavers 120 (FIG. 2) of the IEEE 802.11n Standard compliant PHY unit 100, the interleavers 220 are extended to cover longer bit streams corresponding to wider bandwidth OFDM symbols, such as 80 MHz, 120 MHz, 160 MHz, etc. As will be described further below, in some embodiments of the PHY unit 200, a transmit chain includes multiple radios so that a wideband OFDM symbol is transmitted as multiple sub-OFDM symbols via respective radios. For example, an 80 MHz-wide OFDM symbol is transmitted via two radios, each having a bandwidth of 40 MHz. As another example, a 160 MHz-wide OFDM symbol is transmitted via two radios, each having a bandwidth of 80 MHz. As another example, a 160 MHz-wide OFDM symbol is transmitted via four radios, each having a bandwidth of 40 MHz. In one embodiment in which a wide-band OFDM symbol is transmitted via multiple radios, multiple interleavers 220 may be utilized such that a separate interleaver 220 corresponds to each radio used to transmit the wide-band OFDM symbol.

Also corresponding to each spatial stream, a constellation mapper 224 maps an interleaved sequence of bits to constellation points corresponding to different subcarriers of an OFDM symbol. More specifically, for each spatial stream, the constellation mapper 224 translates every bit sequence of length $\log_2(M)$ into one of M constellation points. The constellation mapper 224 handles different numbers of constellation points depending on the MCS being utilized. In an embodiment, the constellation mapper 224 is a quadrature amplitude modulation (QAM) mapper that handles M=2, 4, 16, 64, 256, and 1024. In other embodiments, the constellation mapper 224 handles different modulation schemes corresponding to M equaling different subsets of at least two values from the set {2, 4, 16, 64, 256, 1024}.

A space-time block coding unit 228 receives the constellation points corresponding to the one or more spatial streams and spreads the spatial streams to a greater number of space-time streams. The space-time block coding unit 228 can be controlled to merely pass through spatial streams without performing space-time block coding. For example, when the number of spatial streams is equal to the maximum number of space-time streams, the space-time block coding unit 228 does not perform space-time block coding. In some embodiments, the space-time block coding unit 228 is omitted.

A plurality of CSD units 232 insert cyclic shifts into all but one of the space-time streams (if more than one space-time stream). The cyclic shifts are to prevent unintentional beam-forming. For ease of explanation, the inputs to the CSD units 232 are referred to as space-time streams even in embodiments in which the space-time block coding unit 228 is omitted. In one embodiment, the frequency CDD values applied on each of four space-time streams is the same as the frequency CDD values specified in the IEEE 802.11n Standard. In another embodiment, the frequency CDD values applied on each of four space-time streams is different than the frequency CDD values specified in the IEEE 802.11n Standard. In one embodiment, if more than four space-time streams are utilized, the frequency CDD values are defined similarly to the definitions in the IEEE 802.11n Standard.

In one embodiment, the time CDD values applied on each of four space-time streams is the same as the time CDD values specified in the IEEE 802.11n Standard. In another embodiment, the time CDD values applied on each of four space-time streams is different than the time CDD values specified in the IEEE 802.11n Standard. In one embodiment, if more than four space-time streams are utilized, the time CDD values are defined to be values within the range [−200 0] ns. In another embodiment, if more than four space-time streams are utilized, the time CDD values are defined to be values within a suitable range different than the range [−200 0] ns.

A spatial mapping unit 236 maps the space-time streams to transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation point from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains.

In one embodiment, the spatial mapping unit 236 applies a steering matrix Q (e.g., multiplies an $N_{STS} \times 1$ signal vector s by Q, i.e., Qs), where Q has a size ($N_{TX} \times N_{STS}$), where $N_{TX}$ is the number of transmit chains and $N_{STS}$ is the number of space-time streams. When beamforming is utilized, the matrix Q is generated based on the MIMO channel between the transmitter and the receiver. In one embodiment, $N_{TX}$ has a maximum value of 8. In another embodiment, $N_{TX}$ has a maximum value of 16. In other embodiments, $N_{TX}$ has a different maximum value such as 4, 32, 64, etc.

Each output of the spatial mapping unit 236 corresponds to a transmit chain, and each output of the spatial mapping unit 236 is operated on by an IDFT unit 240 that converts a block of constellation points to a time-domain signal.

Outputs of the IDFT units 240 are provided to GI insertion and windowing units 244 that prepend, to each OFDM symbol, a circular extension of the OFDM symbol and smooth the edges of each symbol to increase spectral decay. Outputs of the GI insertion and windowing units 244 are provided to analog and RF units 248 that convert the signals to analog signals and upconvert the signals to RF frequencies for transmission. As will be discussed below, the signals are transmitted in a 20 MHz, a 40 MHz, an 80 MHz, a 120 MHz, or a 160 MHz bandwidth channel, in various embodiments and/or scenarios.

Example communication channel characteristics and OFDM subcarrier configurations that correspond to transmit signals generated by the example PHY unit 200 of FIG. 3, according to several embodiments, will now be discussed.

Channels

FIGS. 4A-4F are diagrams of communication channels via which signals are transmitted according to the first communication protocol, in some embodiments. The PHY unit 200 (FIG. 3) is configured, in some embodiments, to generate transmit signals that occupy a channel such as one of the channels of FIGS. 4A-4F, or another suitable channel. In some embodiments, PHY unit 200 (FIG. 3) is configured to generate transmit signals corresponding to different channels, such as the channels of FIGS. 4A-4F, or other suitable channels, depending on channel conditions, the capabilities of the receive device, etc.

FIG. 4A is a diagram showing an example contiguous 80 MHz channel 270. In one embodiment, the channel 270 is transmitted using a single radio transceiver architecture. In another embodiment, the channel 270 is transmitted using a dual radio transceiver architecture having two separate front end blocks. For example, in this embodiment, a first radio transceiver transmits a lower portion of the channel 270, and a second radio transceiver transmits an upper portion of the channel 270. Referring again to FIG. 3, in one embodiment, separate IDFT blocks 240, separate GI insertion and windowing units 244, and separate analog and RF units 248 generate the lower and upper portions, whereas scrambling, encoding, interleaving, constellation mapping, etc., operate over the entire 80 MHz channel. In another embodiment, separate scrambling units 204, separate encoders 212, separate interleaving units 220, separate constellation mapping units 224, etc, and separate IDFT blocks 240, separate GI insertion and windowing units 244, and separate analog and RF units 248 generate the lower and upper portions.

FIG. 4B is a diagram showing an example contiguous 120 MHz channel 274. In one embodiment, the channel 274 is transmitted using a single radio transceiver architecture. In another embodiment, the channel 274 is transmitted using a dual radio transceiver architecture having two separate front end blocks. For example, in this embodiment, a first radio transceiver transmits a lower portion of the channel 274, and a second radio transceiver transmits an upper portion of the channel 274. In one embodiment, one of the upper portion and the lower portion has a bandwidth of 80 MHz, and the other of the upper portion and the lower portion has a bandwidth of 40 MHz. Referring again to FIG. 3, in one embodiment, separate IDFT blocks 240, separate GI insertion and windowing units 244, and separate analog and RF units 248 generate the lower and upper portions, whereas scrambling, encoding, interleaving, constellation mapping, etc., operate over the entire 120 MHz channel. In another embodiment, separate scrambling units 204, separate encoders 212, separate interleaving units 220, separate constellation mapping units 224, etc, and separate IDFT blocks 240, separate GI insertion and windowing units 244, and separate analog and RF units 248 generate the lower and upper portions.

FIG. 4C is a diagram showing an example contiguous 160 MHz channel 278. In one embodiment, the channel 278 is transmitted using a single radio transceiver architecture. In another embodiment, the channel 278 is transmitted using a dual radio transceiver architecture having two separate front end blocks. For example, in this embodiment, a first radio transceiver transmits a lower portion of the channel 278, and a second radio transceiver transmits an upper portion of the channel 278. Referring again to FIG. 3, in one embodiment, separate IDFT blocks 240, separate GI insertion and windowing units 244, and separate analog and RF units 248 generate the lower and upper portions, whereas scrambling, encoding, interleaving, constellation mapping, etc., operate over the entire 160 MHz channel. In another embodiment, separate scrambling units 204, separate encoders 212, separate interleaving units 220, separate constellation mapping units 224, etc, and separate IDFT blocks 240, separate GI insertion and windowing units 244, and separate analog and RF units 248 generate the lower and upper portions.

FIG. 4D is a diagram showing an example non-contiguous 80 MHz channel 282, having a lower portion and an upper portion separated in frequency by some minimum bandwidth such as 1 MHz, 5 MHz, 10 MHz, 20 MHz, 40 MHz, etc., or some other suitable minimum bandwidth. In other words, the upper and lower portions are disjoint. In another embodiment, there is not a minimum separation, and the distance (in frequency) between the upper and lower portions is permitted to reach as little as zero, in some scenarios. In one embodiment, the channel 282 is transmitted using a dual radio transceiver architecture having two separate front end blocks. For example, in this embodiment, a first radio transceiver transmits a lower portion of the channel 282, and a second radio transceiver transmits an upper portion of the channel 282. In one embodiment having a dual radio transceiver architecture, the PHY unit is configured to additionally generate a contiguous channel with the dual radios. In this embodiment, the lower portion and the upper portion are considered to be separated in frequency by 0 MHz, i.e., the lower portion and the upper portion are not separated in frequency and are thus contiguous. Referring again to FIG. 3, in one embodiment, separate IDFT blocks 240, separate GI insertion and windowing units 244, and separate analog and RF units 248 generate the lower and upper portions, whereas scrambling, encoding, interleaving, constellation mapping, etc., operate over the entire 80 MHz channel. In another embodiment, separate scrambling units 204, separate encoders 212, separate interleaving units 220, separate constellation mapping units 224, etc, and separate IDFT blocks 240, separate GI insertion and windowing units 244, and separate analog and RF units 248 generate the lower and upper portions.

FIG. 4E is a diagram showing an example non-contiguous 120 MHz channel 286, having a lower portion and an upper portion separated in frequency by some suitable minimum bandwidth. In one embodiment, the channel 286 is transmitted using a dual radio transceiver architecture having two separate front end blocks. For example, in this embodiment, a first radio transceiver transmits a lower portion of the channel 286, and a second radio transceiver transmits an upper portion of the channel 286. Referring again to FIG. 3, in one embodiment, separate IDFT blocks 240, separate GI insertion and windowing units 244, and separate analog and RF units 248 generate the lower and upper portions, whereas scrambling, encoding, interleaving, constellation mapping, etc., operate over the entire 120 MHz channel. In another embodiment, separate scrambling units 204, separate encoders 212, separate interleaving units 220, separate constellation mapping units 224, etc, and separate IDFT blocks 240, separate GI insertion and windowing units 244, and separate analog and RF units 248 generate the lower and upper portions.

FIG. 4F is a diagram showing an example non-contiguous 160 MHz channel 290, having a lower portion and an upper portion separated in frequency by some suitable minimum bandwidth. In one embodiment, the channel 290 is transmitted using a dual radio transceiver architecture having two separate front end blocks. For example, in this embodiment, a first radio transceiver transmits a lower portion of the channel 290, and a second radio transceiver transmits an upper portion of the channel 290. Referring again to FIG. 3, in one embodiment, separate IDFT blocks 240, separate GI insertion and windowing units 244, and separate analog and RF units 248 generate the lower and upper portions, whereas scrambling, encoding, interleaving, constellation mapping, etc., operate over the entire 160 MHz channel. In another embodiment, separate scrambling units 204, separate encoders 212, separate interleaving units 220, separate constellation mapping units 224, etc, and separate IDFT blocks 240, separate GI insertion and windowing units 244, and separate analog and RF units 248 generate the lower and upper portions.

Similarly, in some embodiments, contiguous 10 MHz and 20 MHz channels are transmitted using a single radio transceiver architecture. In other embodiments, contiguous or non-contiguous 10 MHz and 20 MHz channels are transmitted in upper portions and lower portions in a manner similar to that discussed with respect to FIGS. 4A-4E. More generally, the bandwidth of the channel is any suitable bandwidth, and is not limited to 10 MHz, 20 MHz, 40 MHz, 80 MHz, 120 MHz, and 160 MHz. Additionally, a channel may be transmitted in three or more non-contiguous portions using a multiple radio transceiver architecture having three or more separate front end blocks.

In some embodiments, the portions (e.g., upper and lower) of a contiguous or non-contiguous channel are the same bandwidth, such as illustrated in FIGS. 4A-4D and 4F. On the other hand, in some embodiments, the portions (e.g., upper and lower) of a channel have different bandwidths, as illustrated in FIG. 4E.

IDFT/DFT Structure

According to the IEEE 802.11a Standard, an OFDM signal for a 20 MHz channel is generated using a size 64 IDFT. Similarly, according to the IEEE 802.11n Standard, an OFDM signal for a 20 MHz channel is generated using a size 64 IDFT, and an OFDM signal for a 40 MHz channel is generated using a size 128 IDFT.

The PHY unit 200 (FIG. 3) is configured, in some embodiments, to generate OFDM symbols for transmission via channels, such as discussed above.

In one embodiment, an OFDM signal for an 80 MHz channel is generated using a size 256 IDFT, and an OFDM signal for a 160 MHz channel is generated using a size 512 IDFT. In another embodiment, an OFDM signal for a 160 MHz channel is generated using a size 256 IDFT, corresponding to a lower 80 MHz portion, and a size 256 IDFT, corresponding to an upper 80 MHz portion. In one embodiment, an OFDM signal for a 120 MHz channel is generated using a size 128 IDFT, corresponding to a 40 MHz portion, and a size 256 IDFT, corresponding to an 80 MHz portion. The PHY unit 200 (FIG. 3) is configured, in some embodiments, to generate IDFTs of different suitable sizes such as one or more of a size 64 IDFT, a size 128 IDFT, a size 256 IDFT, a size 512 IDFT, etc. Referring to FIG. 3, for example, each of the IDFT units 240 is configured to generate IDFTs of different suitable sizes such as one or more of a size 64 IDFT, a size 128 IDFT, a size 256 IDFT, a size 512 IDFT, etc.

Tone Mapping/Subcarrier Design

FIGS. 5A, 5B, 6A, 6B, 7A, and 7B are diagrams of OFDM symbols that are generated according to the first communication protocol, in some embodiments. The PHY unit 200 (FIG. 3) is configured, in some embodiments, to generate OFDM symbols such as one of the OFDM symbols of FIGS. 5A, 5B, 6A, 6B, 7A, and 7B, or another suitable OFDM symbol. In some embodiments, PHY unit 200 (FIG. 3) is configured to generate different OFDM symbols, such as the OFDM symbols of FIGS. 5A, 5B, 6A, 6B, 7A, and 7B, or other suitable OFDM symbols, depending on channel conditions, the capabilities of the receive device to which the OFDM symbol is being transmitted, etc.

Referring now to FIG. 5A, an OFDM symbol 310 for a 20 MHz channel, according to one embodiment, corresponds to a size 64 IDFT and includes 64 tones. The 64 tones are indexed from −32 to +31, in an embodiment. The 64 tones include 11 guard tones, a direct current (DC) tone, data tones, and pilot tones. The four lowest frequency tones and the three highest frequency tones are guard tones, which are provided for filter ramp up and ramp down. The index-0 tone is a DC tone, which is provided for mitigating radio frequency interference. The OFDM symbol 310 includes 56 data/pilot tones. The OFDM symbol 310 has the same format as specified in the IEEE 802.11n Standard.

Referring now to FIG. 5B, an OFDM symbol 330 for a 40 MHz channel, according to one embodiment, corresponds to a size 128 IDFT and includes 128 tones. The 128 tones are indexed from −64 to +63, in an embodiment. The 128 tones include guard tones, DC tones, data tones, and pilot tones. The six lowest frequency tones and the five highest frequency tones are guard tones. The three tones indexed from −1 to +1 are DC tones. The OFDM symbol 330 includes 114 data/pilot tones. The OFDM symbol 330 has the same format as specified in the IEEE 802.11n Standard.

Figure 6A:
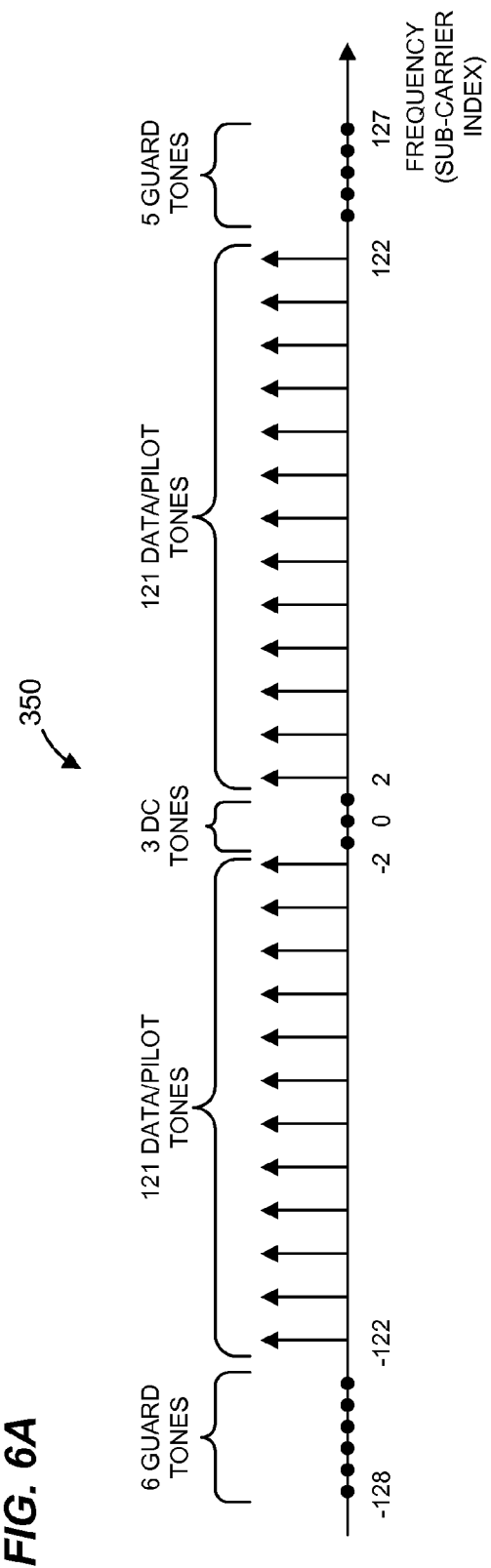
FIGS. 6A and 6B are diagrams of two example OFDM symbols for 80 MHz communication channels that the PHY unit of FIG. 3 is configured to generate, according to some embodiments.

Referring now to FIG. 6A, an OFDM symbol 350 for an 80 MHz channel, according to one embodiment, corresponds to a size 256 IDFT (or two 128 IDFTs) and includes 256 tones. The 256 tones are indexed from −128 to +127, in an embodiment. The 256 tones include guard tones, DC tones, data tones, and pilot tones. The six lowest frequency tones and the five highest frequency tones are guard tones. The three tones indexed from −1 to +1 are DC tones. The OFDM symbol 350 includes 242 data/pilot tones.

Figure 6B:
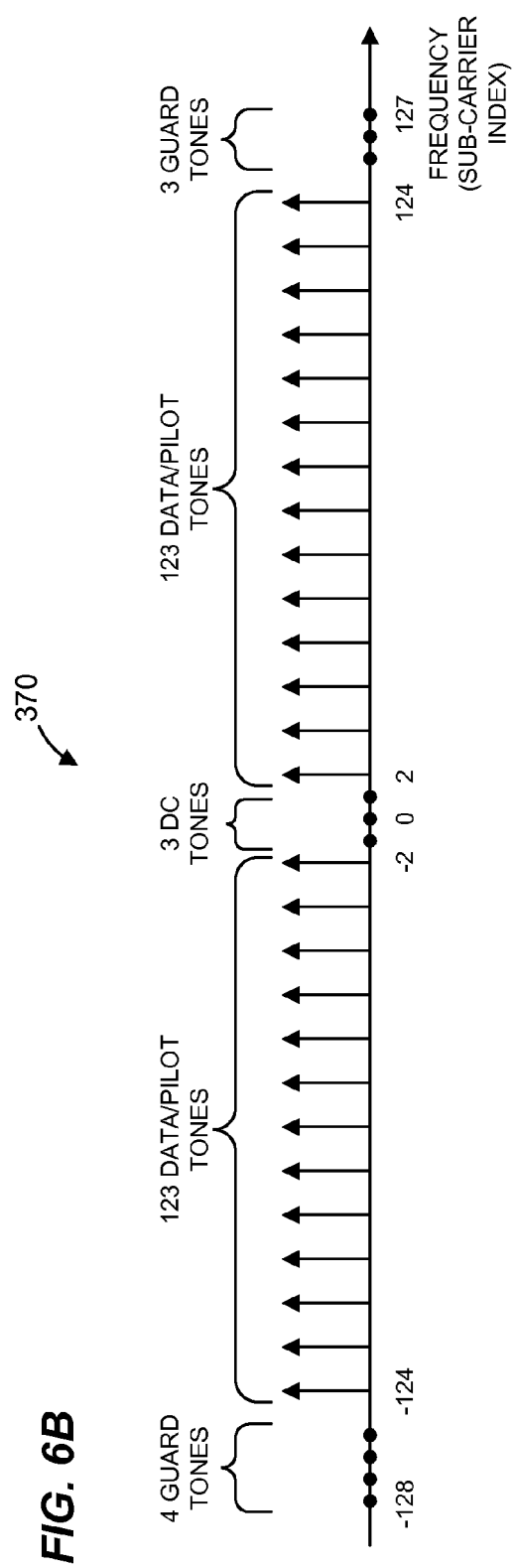

Referring now to FIG. 6B, an OFDM symbol 370 for an 80 MHz channel, according to one embodiment, corresponds to a size 256 IDFT (or two 128 IDFTs) and includes 256 tones. The 256 tones are indexed from −128 to +127, in an embodiment. The 256 tones include guard tones, DC tones, data tones, and pilot tones. The four lowest frequency tones and the three highest frequency tones are guard tones. The three tones indexed from −1 to +1 are DC tones. The OFDM symbol 370 includes 246 data/pilot tones.

In some embodiments, an OFDM symbol for an 80 MHz channel corresponds to two concatenated 40 MHz OFDM symbols. For example, referring now to FIG. 7A, an OFDM symbol 390 for an 80 MHz channel, according to another embodiment, corresponds to a size 256 IDFT (or two 128 IDFTs) and includes 256 tones. The 256 tones are indexed from −128 to +127, in an embodiment. The 256 tones include guard tones, null tones, DC tones, data tones, and pilot tones. The six lowest frequency tones and the five highest frequency tones are guard tones. Eleven tones indexed from −5 to +5 are DC tones. Three tones indexed from −63 to −65 and three tones indexed from +63 to +65 are null tones. The OFDM symbol 390 includes 57 data/pilot tones indexed from −6 to −62, 57 data/pilot tones indexed from −66 to −122, 57 data/pilot tones indexed from +6 to +62, and 57 data/pilot tones indexed from +66 to +122. Comparing FIG. 7A, with FIG. 5B, the 80 MHz OFDM symbol 390 corresponds to two concatenated 40 MHz OFDM symbols 330.

Figure 7A:
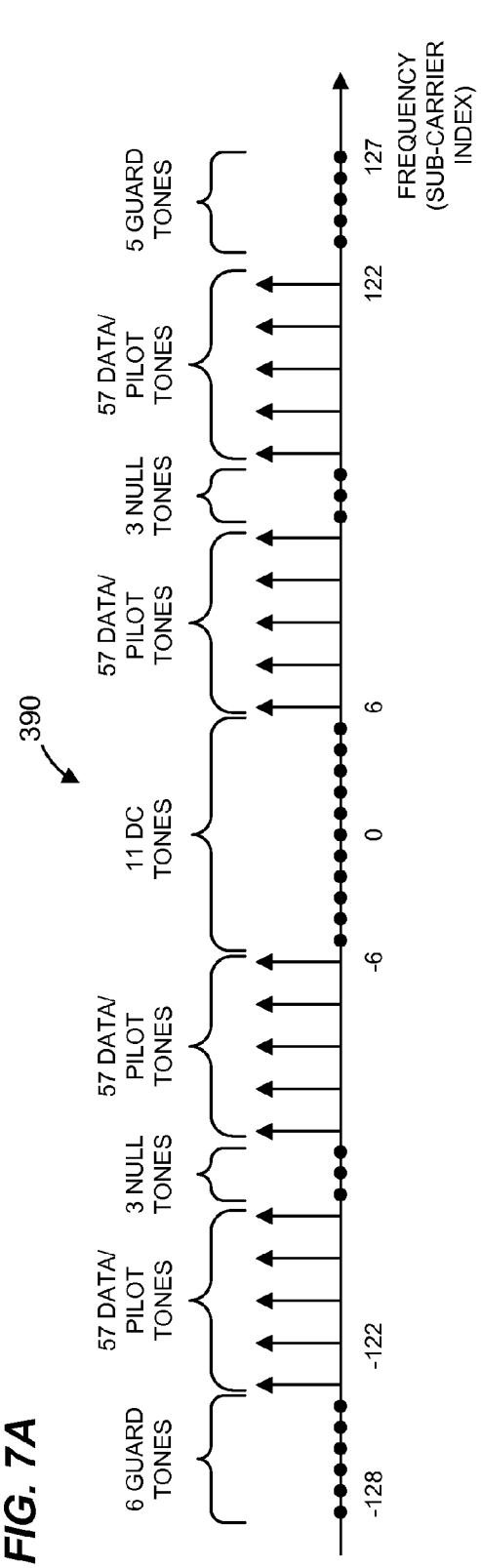
FIGS. 7A and 7B are diagrams of two example OFDM symbols for 80 MHz communication channels that the PHY unit of FIG. 3 is configured to generate, according to some embodiments.
Figure 7B:
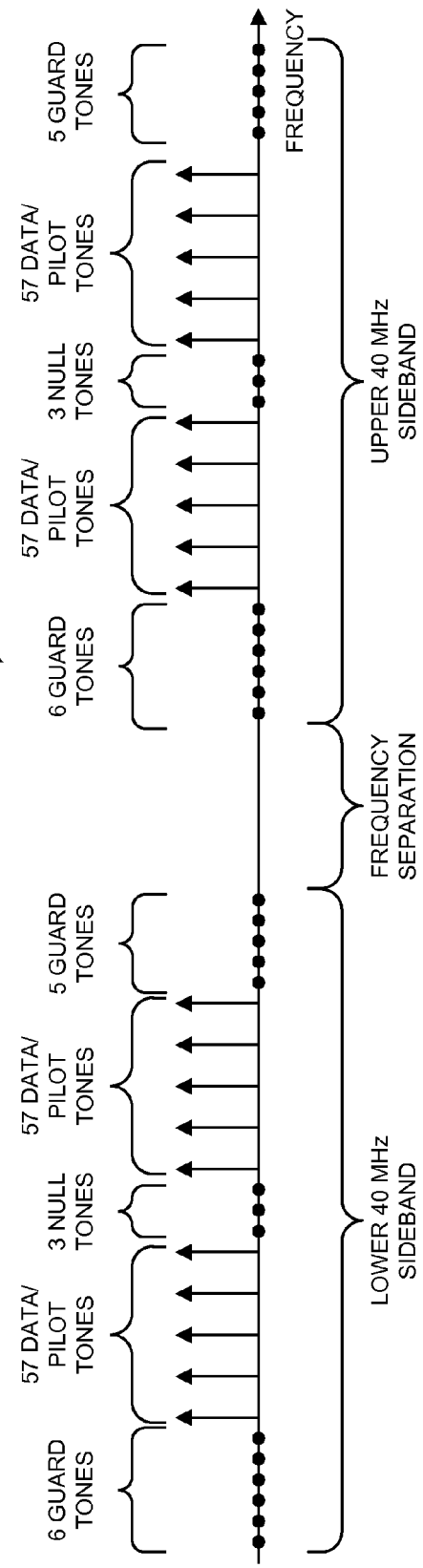

Referring now to FIG. 7B, an OFDM symbol 410 for a non-contiguous 80 MHz channel, according to one embodiment, corresponds to a size 256 IDFT (or two 128 IDFTs), includes 256 tones with a separation in frequency between an lower 40 MHz sideband and an upper 40 MHz sideband. Comparing FIG. 7B, with FIG. 5B, the 80 MHz OFDM symbol 390 corresponds to two 40 MHz OFDM symbols 330, with a frequency separation between the two OFDM symbols 330.

With OFDM symbols for 120 MHz and 160 MHz communication channels, a multiple radio PHY unit is utilized, in some embodiments. In some embodiments, 120 MHz and 160 MHz symbols are formed by concatenating two or more 40 MHz and/or 80 MHz OFDM symbols, in a manner similar to the example OFDM symbols of FIGS. 7A and 7B. In some embodiments utilizing multiple radio PHY units, concatenated OFDM symbols are separated in frequency, such as in FIG. 7B, in some scenarios.

Pilot Tones

Communication systems that utilize OFDM modulation often utilize pilot tones for frequency offset estimation, for example, and some tones or sub-carriers are reserved for pilots. For instance, the IEEE 802.11n Standard specifies that 20 MHz OFDM symbols have four pilot tones at sub-carrier indices {±7, ±21}. Similarly, the IEEE 802.11n Standard specifies that 40 MHz OFDM symbols have six pilot tones at sub-carrier indices {±11, ±25, ±53}.

In an embodiment of the first communication protocol that is backward compatible with the IEEE 802.11n Standard, at least some of the pilot positions are kept the same as specified in the IEEE 802.11n Standard.

Figure 8A:
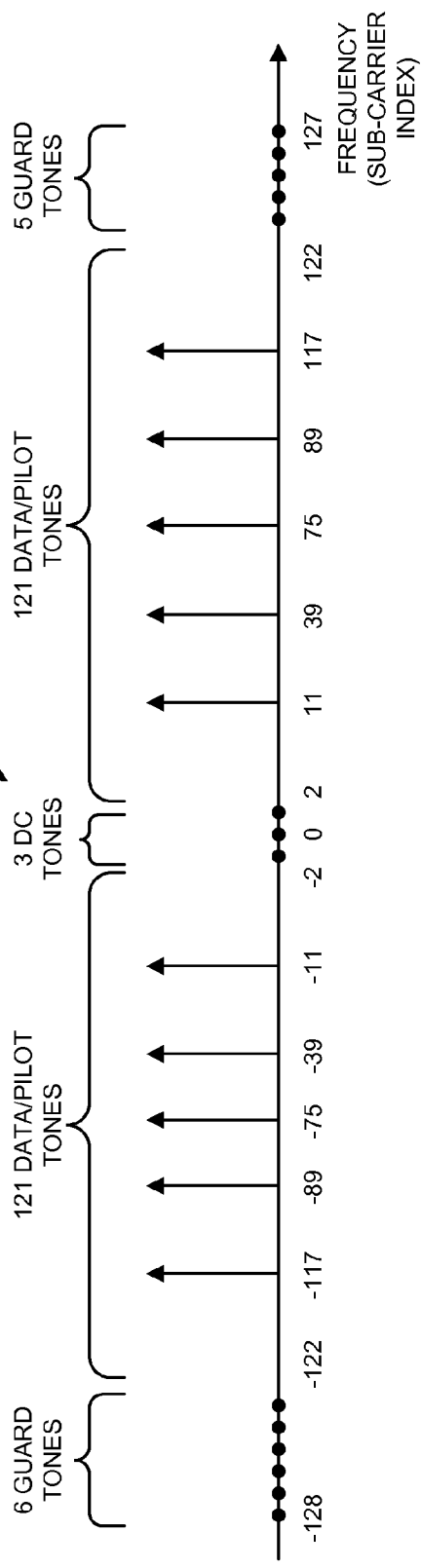
FIGS. 8A-8C are diagrams of three example OFDM symbols for 80 MHz communication channels, according to some embodiments, where the diagrams show numbers and locations of pilot symbols.
Figure 8B:
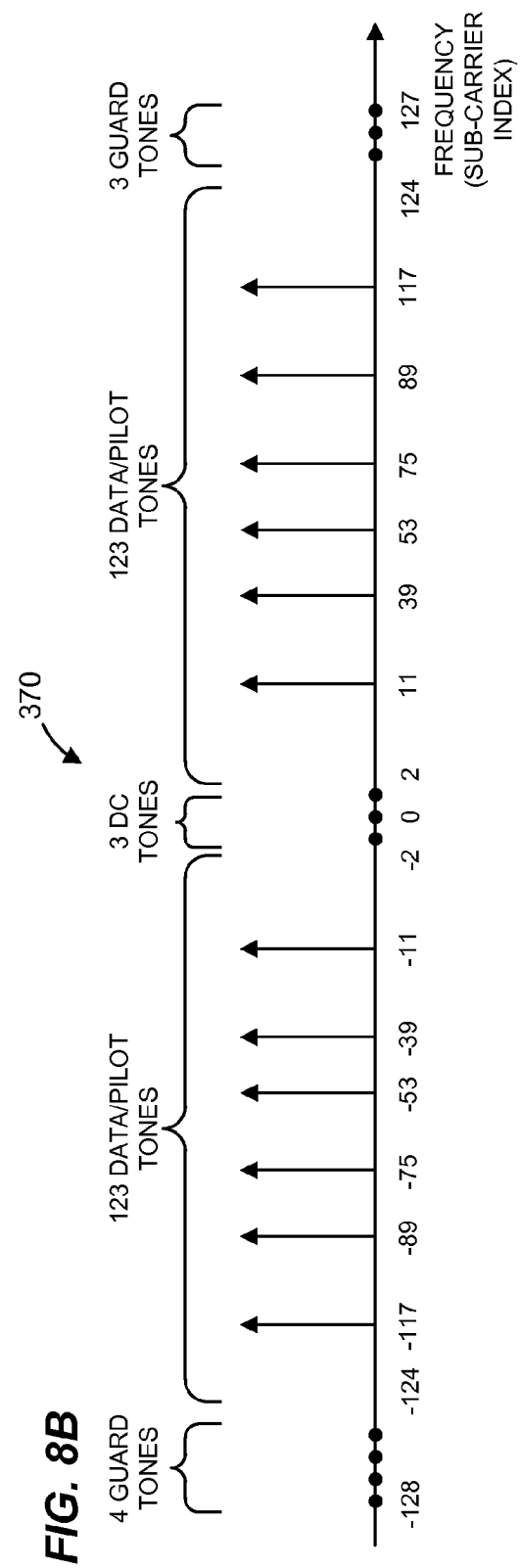
Figure 8C:
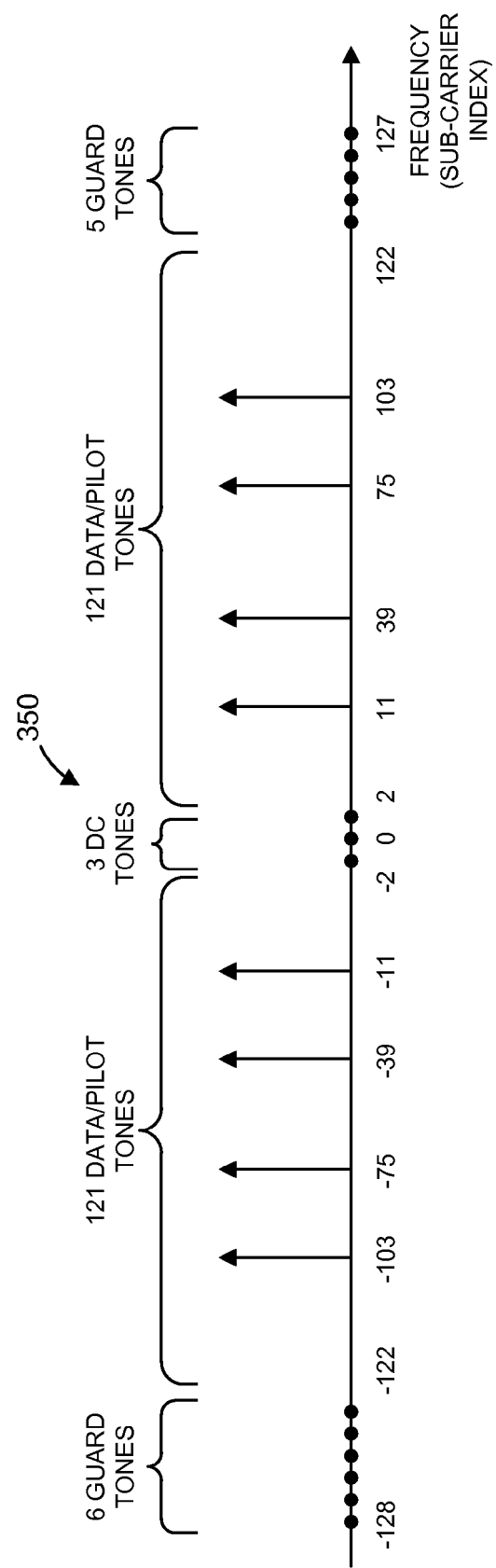

FIG. 8A is a diagram of the OFDM symbol 350 (FIG. 6A) for an 80 MHz channel and showing example locations of pilot tones, according to one embodiment. The OFDM symbol 350 includes ten pilot tones at sub-carrier indices {±11, ±39, ±75, ±89, ±117}, in one embodiment. FIG. 8B is a diagram of the OFDM symbol 370 (FIG. 6B) for an 80 MHz channel and showing example locations of pilot tones, according to one embodiment. The OFDM symbol 350 includes twelve pilot tones at sub-carrier indices {±11, ±39, ±53, ±75, ±89, ±117}, in one embodiment. FIG. 8C is a diagram of the OFDM symbol 350 (FIG. 6A) for an 80 MHz channel and showing example locations of pilot tones, according to another embodiment. The OFDM symbol 350 includes eight pilot tones at sub-carrier indices {±11, ±39, ±75, ±103}, in one embodiment.

More generally, in some embodiments, an 80 MHz OFDM symbol has one of i) eight, ii) ten, or iii) twelve pilot tones at location pairs belonging to the set of {±11, ±25, ±39, ±53, ±75, ±89, ±103, ±117}. In other embodiments, different numbers of pilot tones and/or different location pairs than discussed above are utilized. For 120 MHz and 160 MHz OFDM symbols, numbers of pilot tones and pilot tone locations are chosen based on positions of pilots in constituent 40 MHz and/or 80 MHz OFDM symbols, in some embodiments. In other embodiments, numbers of pilot tones and pilot tone locations for 120 MHz and 160 MHz OFDM symbols are chosen irregardless of the positions of pilots in 40 MHz and/or 80 MHz OFDM symbols utilized in the first communication protocol.

In the IEEE 802.11n Standard, pilot values for L pilots (L=4 for a 20 MHz OFDM symbol, and L=6 for a 40 MHz OFDM symbol) on the n-th pilot symbol on the i-th spatial stream are given by:

$$P_{i,n} = [\Psi_{i,n\%L} \, \Psi_{i,(n+1)\%L} \cdots \Psi_{i,(n+L-1)\%L}], \quad \text{Equ. 3}$$

where $P_{i,n}$ is a vector of L pilot values for the n-th OFDM symbol of the i-th spatial stream, and $\Psi_{i,j}$ are pilot values. For the IEEE 802.11n Standard, each $\Psi_{i,j}$ belongs to the set of {−1, 1}.

Figures 9A, 9B:
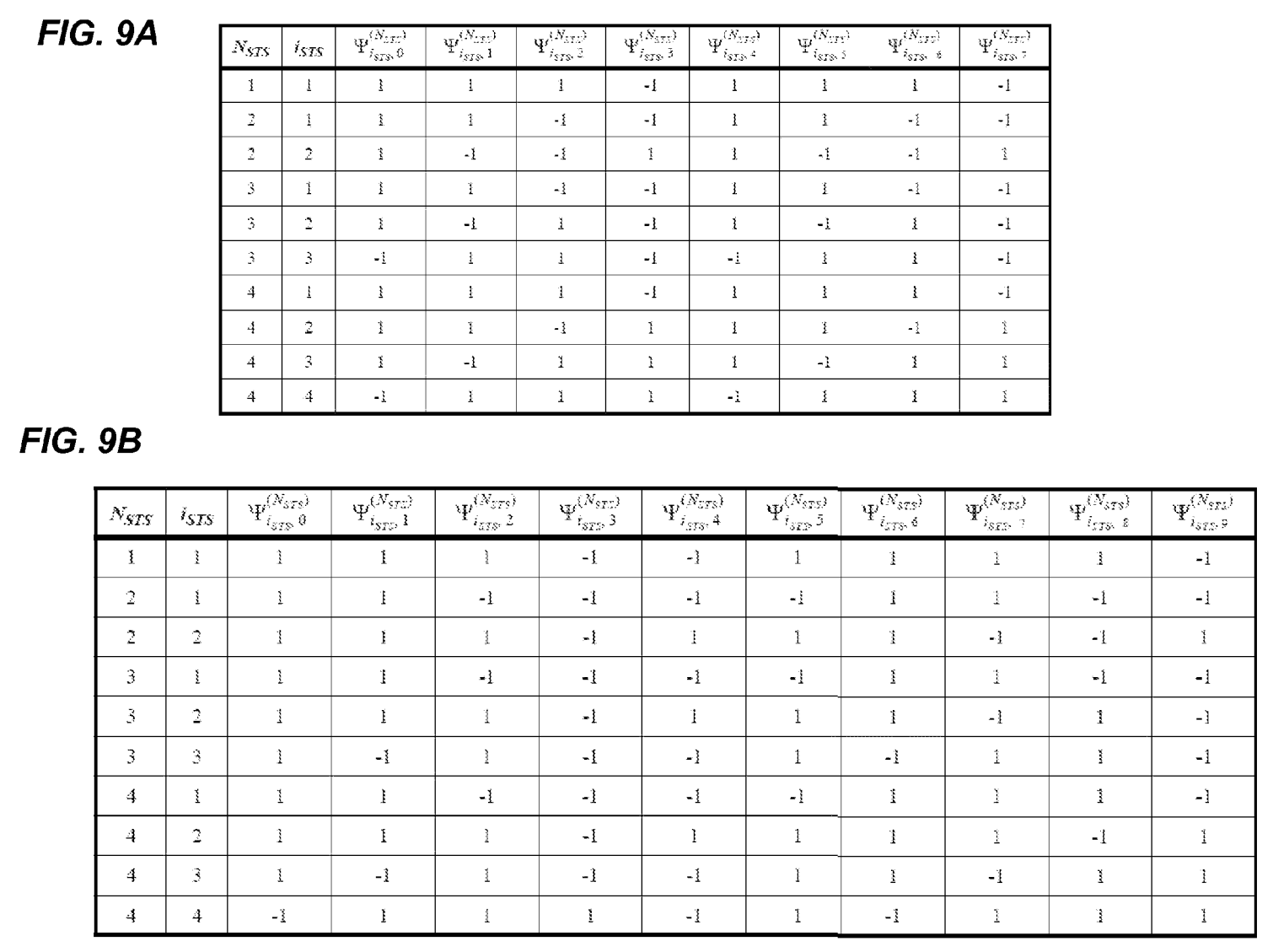

In one embodiment, pilot tone values for 80 MHz OFDM symbols are chosen similarly to pilot values in 20 MHz and 40 MHz OFDM symbols. FIG. 9A is a table showing example pilot values for 80 MHz OFDM symbols having eight pilots, for up to four spatial streams. In FIG. 9A, $N_{STS}$ is the number of space-time streams (sometimes referred to herein as spatial streams), and $i_{STS}$ is a space-time stream index. FIG. 9B is a table showing example pilot values for 80 MHz OFDM symbols having ten pilots, for up to four spatial streams.

In other embodiment, the columns of the examples tables of FIGS. 9A and 9B are permuted to yield new pilot tone value patterns.

In one embodiment, pilot tone values with eight pilots for exactly eight spatial (or space-time) streams is:

$$\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad \text{Equ. 4}$$

where the rows correspond to spatial streams and the columns correspond to pilots. The matrix of Equ. 4 is a Hadamard matrix. For fewer than eight spatial streams, the first $N_{ss}$ rows of the matrix of Equ. 4 are chosen, in an embodiment.

In one embodiment, pilot values for 120 MHz and 160 MHz OFDM symbols are chosen to be a combination of pilot value patterns specified in the IEEE 802.11n Standard for 40 MHz OFDM symbols, and/or pilot value patterns for 80 MHz OFDM symbols.

Data Tones

With the example tone mappings for 80 MHz OFDM symbols discussed above with reference to FIGS. 6A, 6B, 7A, and 7B, and with different numbers of pilot tones, the number of sub-carriers that remain for data transmission can be determined. For example, with OFDM symbol 370 of FIG. 6B, there are 238 data tones when eight pilot tones are utilized, 236 data tones when ten pilot tones are utilized, and 234 data tones when twelve pilot tones are utilized. As another example, with OFDM symbol 350 of FIG. 6A, there are 234 data tones when eight pilot tones are utilized, 232 data tones when ten pilot tones are utilized, and 230 data tones when twelve pilot tones are utilized. As yet another example, with OFDM symbol 390 of FIG. 7A or the OFDM symbol 410 of FIG. 7B, there are 220 data tones when eight pilot tones are utilized, 218 data tones when ten pilot tones are utilized, and 216 data tones when twelve pilot tones are utilized. In one embodiment, with OFDM symbol 390 of FIG. 7A or the OFDM symbol 410 of FIG. 7B, only twelve pilot tones are utilized thus providing 216 data tones. More generally, depending on the particular OFDM symbol configuration and the number pilot tones, an 80 MHz OFDM symbol will have a number of data tones chosen from the set {216, 228, 230, 232, 234, 236, 238}, according to one embodiment. In other embodiments, an 80 MHz OFDM symbol has a number of data tones that is different than values in the set {216, 228, 230, 232, 234, 236, 238}.

With 120 MHz and 160 MHz OFDM symbols, the number of data tones is the cumulative number of data tones in 40 MHz and/or 80 MHz OFDM symbols that make up the 120 MHz or 160 MHz OFDM symbol, according to some embodiments.

Figure 10:
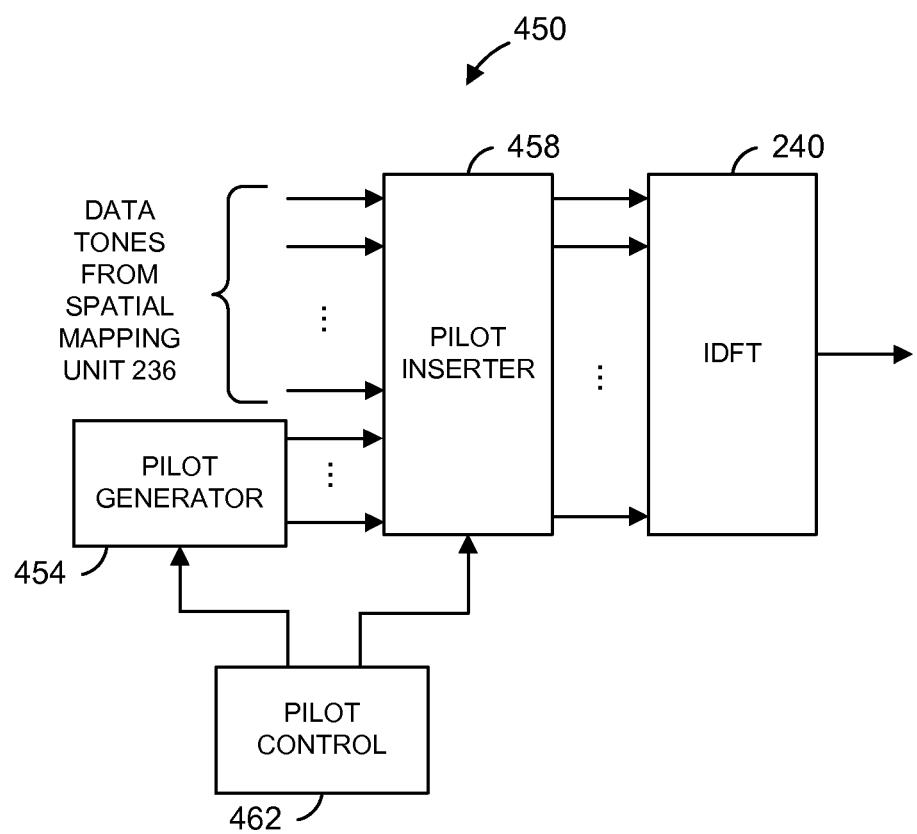
FIG. 10 is a block diagram of an example pilot tone system that is implemented in the PHY unit of FIG. 3, according to some embodiments.

FIG. 10 is a block diagram of an example pilot system 450. The pilot system 450 is utilized in the PHY unit 200 of FIG. 3, according to an embodiment. The PHY unit 200 utilizes another suitable pilot system different than the pilot system 450 in other embodiments. Referring now to FIG. 10, the pilot system 450 includes a pilot generator 450 that generates suitable pilot tone values, such as pilot tone values discussed above or similar pilot tone values. A pilot inserter 458 receives the pilot tone values as well as data tones from the spatial mapping unit 236. The pilot inserter 458 inserts the pilot tone values within the data tones at suitable tone indexes to generate an IDFT input. The IDFT input is then provided to an IDFT unit 240. A pilot control unit 462 generates control signals provided to the pilot generator 454 and the pilot inserter 458 to control the number of pilots generated, the tone index positions of the pilot signals, etc. In various embodiments, the number and positions of pilots vary according to factors such as one or more of the bandwidth of the channel being utilized (e.g., 20 MHz, 40 MHz, 80 MHz, etc.), channel conditions (e.g., poor channel conditions may call for more pilots, good channel conditions allow less pilots and therefore higher throughput), etc.

Padding

Padding is utilized is various circumstances, in some embodiments. For example, padding is utilized to lengthen a set of information bits to be an input size of a block encoder, in one embodiment. As another example, padding is utilized to lengthen a set of information data to fill entirely an integer number of OFDM symbols in one embodiment. In one embodiment, padding is utilized both to lengthen a set of information bits to be an input size of a block encoder, and to lengthen a set of information data to fill entirely an integer number of OFDM symbols. Padding involves adding bits or symbols of a known value or values (e.g., zero or some other suitable value or set of values) to a set of information bits or symbols, in some embodiments. Referring to FIG. 1, in some embodiments, padding is implemented in the MAC unit 18, 28 and/or the PHY unit 20, 29.

In some embodiments, padding is implemented with equal rate encoding for padding bits and data. In one embodiment, padding is implements with several additional constraints: 1) an equal number of data bits are input to each FEC encoder 212 (FIG. 3); 2) a puncturing block at each FEC encoder 212 operates on an integer number of message blocks, where the message block length depends on the code rate; and 3) a total number of encoded bits fits into an integer number of OFDM symbols.

Figure 11:
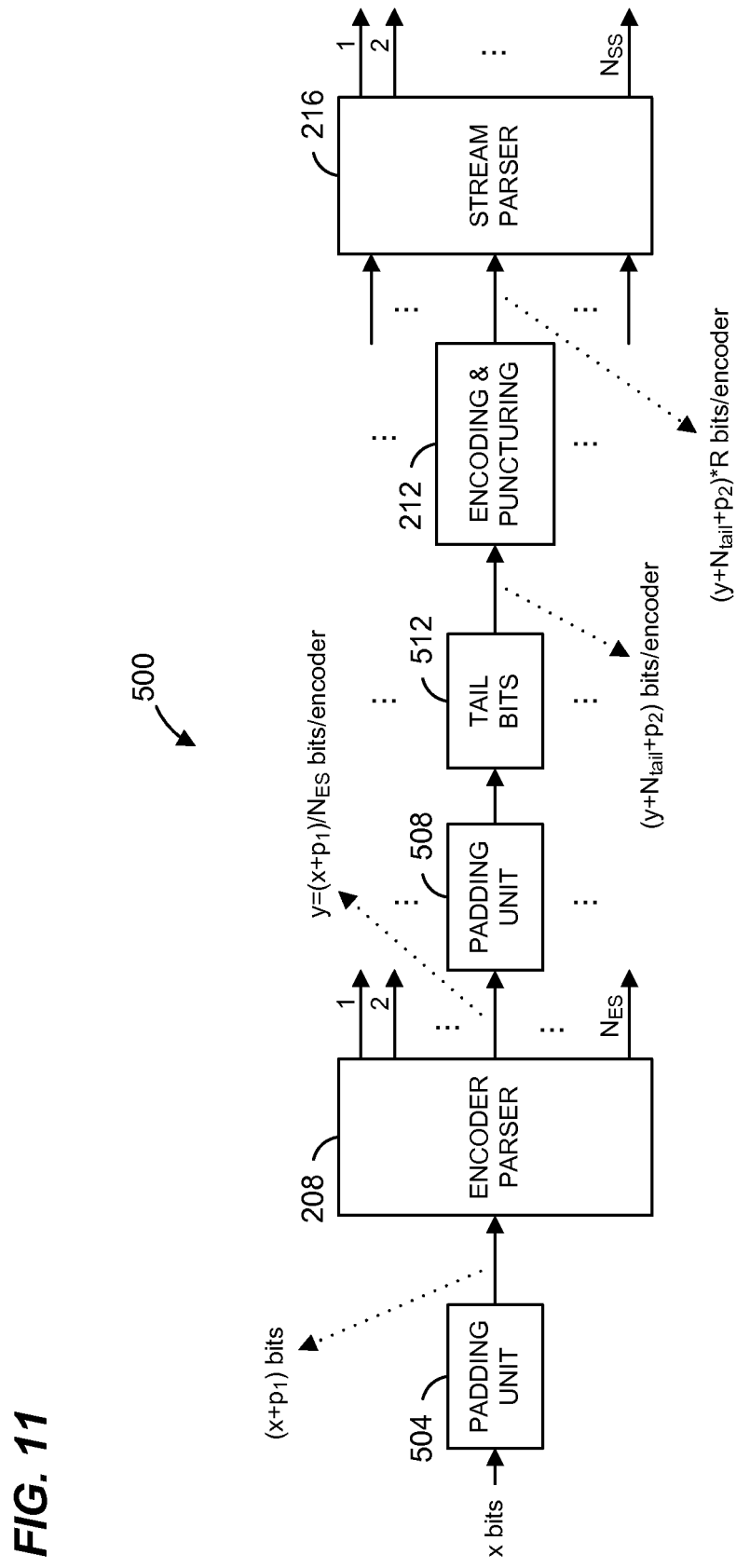
FIG. 11 is a block diagram of an example padding system that is implemented in the PHY unit of FIG. 3, according to some embodiments.

FIG. 11 is a block diagram of an example padding system, according to an embodiment. The padding system 500 is utilized in conjunction with the PHY unit 200 of FIG. 3, according to an embodiment. In another embodiment, another suitable padding system different than the padding system 500 is utilized in conjunction with the PHY unit 200. Referring now to FIG. 11, the padding system 500 includes a first padding unit 504 that receives x bits and adds $p_1$ padding bits. In one embodiment, padding unit 504 adds the $p_1$ padding bits so that an equal number of data bits will be input to each FEC encoder 212 after parsing by the encoder parser 208. In one embodiment, $p_1$ is selected according to:

$$p_1 = N_{ES}\left\lceil \frac{x}{N_{ES}} \right\rceil - x, \quad \text{Equ. 5}$$

The padding unit 504 is included in the PHY unit 200 of FIG. 3, according to one embodiment. The padding unit 504 is included in the MAC unit 18, 28 of FIG. 1, according to another embodiment.

Referring again to FIG. 11, after parsing by the encoder parser 208, $y=(x+p_1)/N_{ES}$ bits are generated on each output of the encoder parser 208, where $N_{ES}$ is the number of FEC encoders 212 being utilized for encoding the information bits. The padding system 500 also includes a respective second padding unit 508 corresponding to each FEC encoder 212. The second padding unit 508 receives y bits and adds $p_2$ padding bits.

A respective tail bit unit 512 adds $M_{tail}$ tail bits. In one embodiment, $N_{tail}$ is six. In other embodiments, $N_{tail}$ is a suitable number other than six. The output of the tail bit unit 512 is $(y+N_{tail}+p_2)$ bits. The FEC encoder 212 performs FEC encoding and puncturing, according to an embodiment, according to a code rate R. Thus, each FEC encoder 212 generates an output having $(y+N_{tail}+p_2)*R$ bits.

In one embodiment, the second padding unit 508 adds the $p_2$ padding bits so that the puncturing block at each FEC encoder 212 operates on an integer number of message blocks, where the message block length depends on the code rate R. In one embodiment, $p_2$ is selected such that:

$$\frac{(y + N_{tail} + p_2)}{R} = k, \, k \in I, \quad \text{Equ. 6}$$

where I is the set of positive integers.

In one embodiment, the second padding unit 508 adds the $p_2$ padding bits also so that a total number of encoded bits fits into an integer number of OFDM symbols. In one embodiment, $p_2$ is selected such that:

$$(y + N_{tail} + p_2) = l\left(\frac{RN_{CBPS}}{N_{ES}}\right),$$
$$l \in I,$$
Equ. 7 where $N_{CBPS}$ is the number of encoded bits per OFDM symbol.

In one embodiment, $N_{DBPS}$ need not be an integer, where $N_{DBPS}$ is the number of decoded bits per OFDM symbol.

Variables $N_R$ and $N_Q$ are defined by the simplest rational forms of:

$$R = \frac{N_R}{D_R},$$
Equ. 8

$$\left(\frac{RN_{CBPS}}{N_{ES}}\right) = \frac{N_Q}{D_Q},$$
Equ. 9

Then, Equation 6 and Equation 7 can be rewritten as:

$$(y+N_{tail}+p_2)D_R = kN_R, k \in I,$$
Equ. 10

$$(y+N_{tail}+p_2)D_Q = lN_Q, k \in I,$$
Equ. 11 which imply that:

$$(y+N_{tail}+p_2) = m\text{LCM}(N_R, N_Q),$$
Equ. 12 where LCM (a, b) is the least common multiple of a and b. In one embodiment, $$D_R = \begin{cases} 2, R = \frac{1}{2} \\ 3, R = \frac{2}{3} \\ 4, R = \frac{3}{4} \\ 6, R = \frac{5}{6} \end{cases}.$$

Therefore, we have:

$$(y + N_{tail} + p_2) = LCM(N_R, N_Q) \left\lceil \frac{y + N_{tail}}{LCM(N_R, N_Q)} \right\rceil,$$
Equ. 13

$$p_2 = LCM(N_R, N_Q) \left\lceil \frac{y + N_{tail}}{LCM(N_R, N_Q)} \right\rceil - (y + N_{tail}),$$
Equ. 14 where $\lceil \alpha \rceil$ denotes the smallest integer greater than or equal to $\alpha$.

Figure 12:
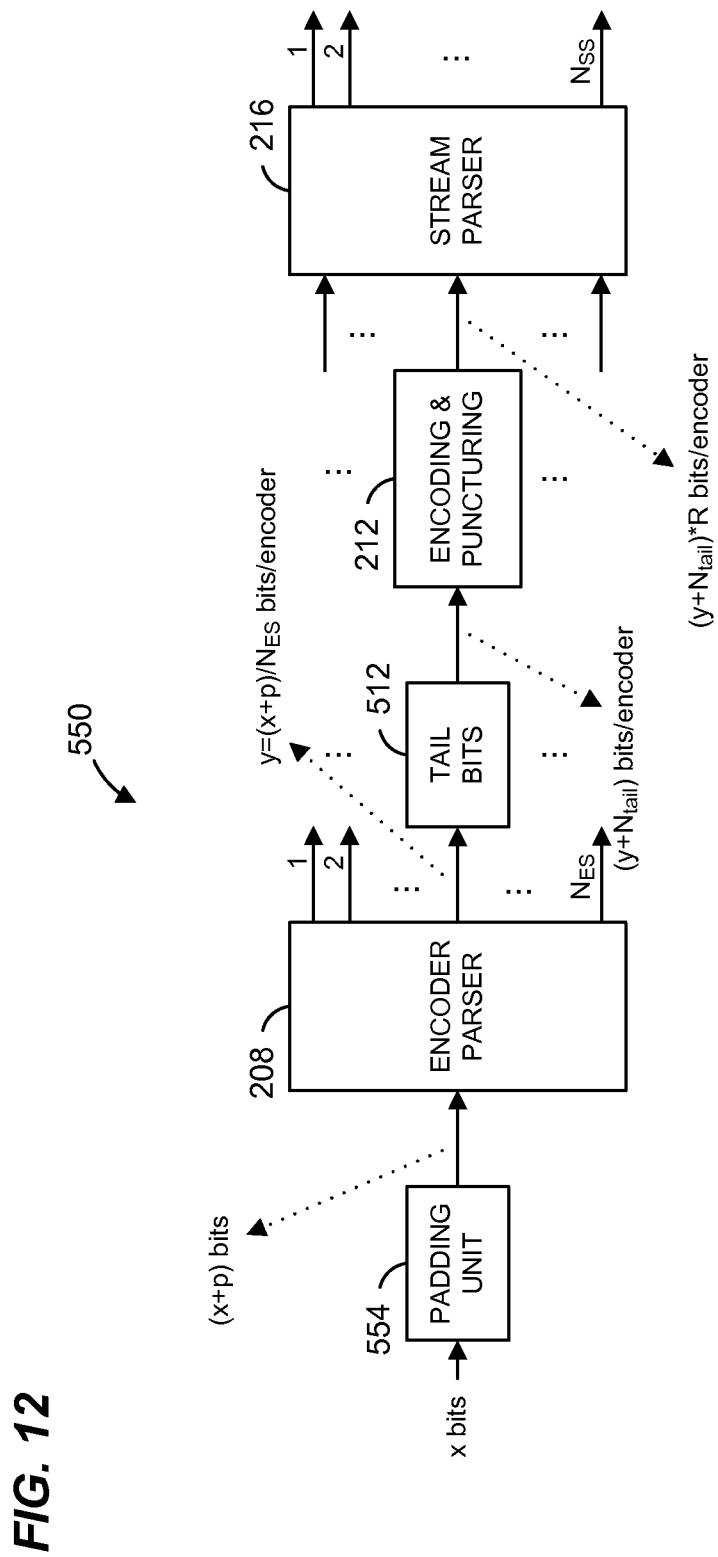
FIG. 12 is a block diagram of another example padding system that is implemented in the PHY unit of FIG. 3, according to other embodiments.

FIG. 12 is a block diagram of another example padding system 550, according to an embodiment. The padding system 550 is utilized in conjunction with the PHY unit 200 of FIG. 3, according to an embodiment. The PHY unit 200 utilizes another suitable padding system different than the padding system 550 in other embodiments. Referring now to FIG. 12, the padding system 550 includes a padding unit 554 that receives x bits and adds p padding bits, where:

$$p=(p_1+N_{ES}p_2)$$
Equ. 15

The padding unit 554 is included in the PHY unit 200 of FIG. 3, according to one embodiment. The padding unit 554 is included in the MAC unit 18, 28 of FIG. 1, according to another embodiment.

Referring again to FIG. 12, after parsing by the encoder parser 208, $y=(x+p)/N_{ES}$ bits are generated on each output of the encoder parser 208. The respective tail bit unit 512 adds $N_{tail}$ tail bits. In one embodiment, $N_{tail}$ is six. In other embodiments, $N_{tail}$ is a suitable number other than six. The output of the tail bit unit 512 is $(y+N_{tail})$ bits. The FEC encoder 212 performs FEC encoding and puncturing, according to an embodiment, according to a code rate R. Thus, each FEC encoder 212 generates an output having $(y+N_{tail})*R$ bits.

Padding is often not limited to a single OFDM symbol. The number of OFDM symbols, in one embodiment, is determined according to:

$$N_{SYM} = \left\lceil \frac{\left(\left\lceil \frac{8L + N_{service}}{N_{ES}} \right\rceil + N_{tail}\right)}{W} \right\rceil \frac{WN_{ES}}{N_{CBPS}R},$$
Equ. 16 where W=LCM $(N_R, N_Q)$, L is a very high throughput (VHT) field length, defined in octets, and $N_{service}$ is a number of service bits.

According to one embodiment, the number of padding bits is determined according to:

$$p = N_{SYM}N_{CBPS}R - (8L + N_{service} + N_{tail}N_{ES})$$
Equ. 17

When STBC is utilized, constellation points from two consecutive OFDM symbols are used and mapped into multiple space-time streams spanning two OFDM symbols, according to some embodiments. Therefore, with STBC, the number of OFDM symbols should be even. This additional constraint is accommodated, in one embodiment, by substituting l=2l in Equation 7:

$$(y + N_{tail} + p_2) = 2l\left(\frac{RN_{CBPS}}{N_{ES}}\right),$$
$$l \in I,$$
Equ. 18

Then, the number of OFDM symbols is given by:

$$N_{SYM} = \left\lceil \frac{\left(\left\lceil \frac{8L + N_{service}}{N_{ES}} \right\rceil + N_{tail}\right)}{W} \right\rceil \frac{WN_{ES}}{N_{CBPS}R},$$
Equ. 19 and where $$W = LCM(N_R, N_Q)$$

and $$\left(\frac{m_{STBC}RN_{CBPS}}{N_{ES}}\right) = \frac{N_Q}{D_Q},$$

and where $m_{STBC}=1$ if STBC is not used and $m_{STBC}=2$ if STBC is used. The number of padding bits is determined according to Equation 17.

In another embodiment in which STBC is utilized, a constraint is satisfied:

$$(y+N_{tail}+p_2)D_Q = 2jN_Q, j \in I,$$
Equ. 20

Then, the number of OFDM symbols is given by:

$$N_{SYM} = \left\lceil \frac{\left(\left\lceil \frac{8L+N_{service}}{N_{ES}} \right\rceil + N_{tail}\right) W N_{ES}}{W} \right\rceil_{N_{CBPS}R}, \quad \text{Equ. 21}$$

and where $W = \text{LCM}(N_R, 2N_Q)$. The number of padding bits is determined according to Equation 17.

In some scenarios, for example some MCS/number of encoders/packet length scenarios, the embodiments described above will result in a large number of padding bits and hence a large number of dummy OFDM symbols. For instance, when a puncturing block does not see an integer number of blocks or when $N_{CBPS}$ is not a multiple of $N_{ES}$, a large number of padding bits may result.

In some embodiments, bits at the end portion of a packet are encoded with a code rate different than a code rate utilized at the remaining portion of the packet. In one embodiment, bits at the end portion of the packet are encoded at a smallest rate, e.g., a ½ convolutional code (message block length of one). This helps to ensure that a puncturing block at each FEC encoder 212 operates on an integer number of message blocks. In one embodiment, an entire packet is encoded with a ½ convolutional code, and then puncturing is performed on a first portion of the packet to achieve a desired coding rate, whereas no puncturing is performed of the end portion of the packet. In one embodiment, padding in a MAC unit is applied prior to encoding the PHY packet such that the end portion of the packet is encoded with a code rate different than a code rate utilized at the remaining portion of the packet.

In one embodiment, a number of tones and allowable MCS's are selected such that the following constraints are satisfied: 1) for rates ½, ¾, and ⅚, $$\text{mod}\left(\frac{N_{CBPS}}{N_{ES}}, D_R\right)$$

is even, which requires $$\frac{N_{CBPS}}{N_{ES}}$$

to be an integer; and 2) for rate ⅔, we ensure that $$\frac{N_{CBPS}}{N_{ES} D_R}$$

is an integer. In this embodiment, the number of OFDM symbols is given by:

$$N_{SYM} = \left\lceil \frac{\left(\left\lceil \frac{8L+N_{service}}{N_{ES}} \right\rceil + N_{tail}\right) N_{ES}}{m_{STBC} R N_{CBPS}} \right\rceil m_{STBC} \quad \text{Equ. 22}$$

In this embodiment, the number of padding bits is given by:

$$p = \left(\left\lceil \frac{N_{SYM} N_{CBPS}}{N_{ES} D_R} \right\rceil N_R N_{ES} + \frac{\text{mod}\left(\frac{N_{SYM} N_{CBPS}}{N_{ES}}, D_R\right)}{2} N_{ES}\right) - \quad \text{Equ. 23}$$

$$(8L + N_{service} + N_{tail} N_{ES})$$

In some embodiments, padding bits are added after encoding, such as when a preamble of a packet includes an indicator of the number of bits in the packet. In one embodiment, the number of OFDM symbols when padding occurs after encoding is given by:

$$N_{SYM} = \left\lceil \frac{\left(\left\lceil \frac{8L+N_{service}+N_{tail}N_{ES}}{N_{ES}N_R} \right\rceil\right) N_{ES} N_R}{m_{STBC} R N_{CBPS}} \right\rceil m_{STBC} \quad \text{Equ. 24}$$

In this embodiment, the number of padding bits after encoding is given by:

$$p_{after} = N_{SYM} N_{CBPS} - \left(\left\lceil \frac{8L+N_{service}+N_{tail}N_{ES}}{N_{ES}N_R} \right\rceil\right) N_{ES} D_R \quad \text{Equ. 25}$$

In this embodiment, the number of padding bits before encoding is given by:

$$p_{before} = \quad \text{Equ. 26}$$

$$\left(\left\lceil \frac{8L+N_{service}+N_{tail}N_{ES}}{N_{ES}N_R} \right\rceil\right) N_{ES} D_R - (8L+N_{service}+N_{tail}N_{ES})$$

In an embodiment, padding bits are added before encoding to ensure that each encoder has the same number of bits, and to ensure that the encoder sees an integer number of puncture patterns. Additionally in this embodiment, padding bits are added after encoding.

In embodiments in which padding bits are added after encoding, packet length information is provided to the receiver to enable decoding of the information. In one embodiment, the packet length information is provided in a PHY data unit preamble. For example, the packet length information provided in the PHY data unit preamble is indicated in terms of OFDM symbols. In another embodiment, the packet length information is provided using MAC layer signaling.

Figure 13:
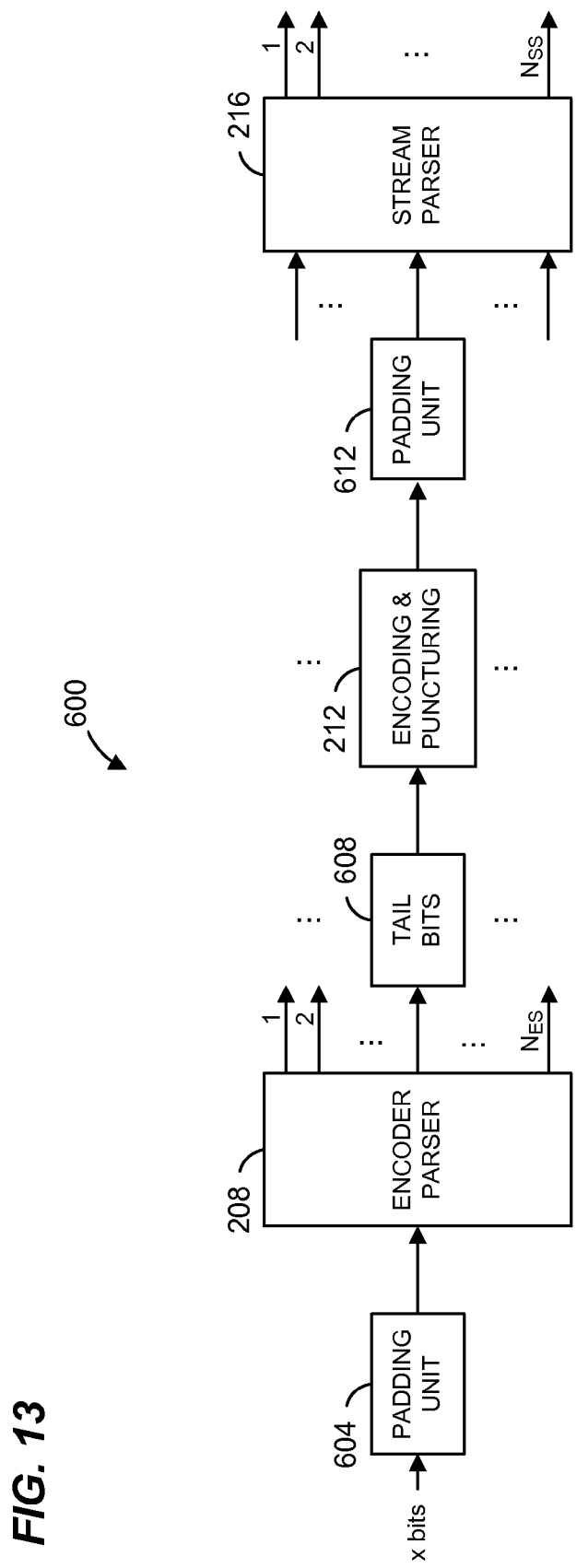
FIG. 13 is a block diagram of still another example padding system that is implemented in the PHY unit of FIG. 3, according to other embodiments.

FIG. 13 is a block diagram of another example padding system 600, according to an embodiment. The padding system 600 is utilized in conjunction with the PHY unit 200 of FIG. 3, according to an embodiment. The PHY unit 200 utilizes another suitable padding system different than the padding system 600 in other embodiments. Referring now to FIG. 13, the padding system 550 includes a first fore padding unit 604 that adds $p_{before}$ padding bits. The padding unit 604 is included in the PHY unit 200 of FIG. 3, according to one embodiment. The padding unit 604 is included in the MAC unit 18, 28 of FIG. 1, according to another embodiment. In one embodiment, MAC unit padding is provided up to a 32-bit or 8-bit boundary.

Referring again to FIG. 13, after parsing by the encoder parser 208, a respective tail bit unit 608 adds $N_{tail}$ tail bits. After the FEC encoder 212, a second padding unit 612 adds $p_{after}$ padding bits.

In some embodiments, MCS's are chosen based on whether one or more conditions corresponding to padding are satisfied. In particular, if the conditions are not satisfied for a particular MCS, the MCS is not utilized for transmission. For example, in one embodiment, only MCS's are utilized that satisfy:

$$\mod\left(\frac{N_{CBPS}}{N_{ES}}, D_R\right) = 0,$$ Equ. 27 which implies that $$\frac{N_{DBPS}}{N_{ES}}$$

and $$\frac{N_{CBPS}}{N_{ES}}$$

are integers. Then, the number of OFDM symbols, according to an embodiment, is determined by:

$$N_{SYM} = m_{STBC}\left\lceil\frac{8L + N_{service} + N_{tail}N_{ES}}{m_{STBC}N_{DBPS}}\right\rceil$$ Equ. 28

The number of padding bits, according to an embodiment, is determined by:

$$p = N_{SYM}N_{DBPS} - 8L - N_{service} - N_{tail}N_{ES}$$ Equ. 29

To satisfy Equation 27, all MCS/encoder combinations cannot be accommodated, according to an embodiment. In one embodiment, MCS entries in an MCS table are excluded from consideration if Equation 27 is not satisfied. In another embodiment, one MCS table is utilized, and an index to the table is interpreted differently depending on the channel bandwidth so that certain MCS entries are excluded from consideration for certain channel bandwidths.

In embodiments of padding techniques discussed above, it is assumed that the encoder parser 208 (FIG. 3) assigns one bit to each encoder in a round robin fashion. Additionally, in the embodiments of padding techniques discussed above, it is assumed that after padding, each encoder has an equal number of input bits. In some embodiments, the encoder parser 208 (FIG. 3) is configured to parse bits to different encoders such that the number of bits parsed to each encoder is not the same for all encoders, in some situations. In these embodiments, the encoder parser 208 is configured so that the puncturing block at each FEC encoder 212 operates on an integer number of message blocks, where the message block length depends on the code rate. In one embodiment, the encoder parser 208 assigns $N_R$ bits to each encoder 212 in a round robin fashion, where $N_R$ can be more than one.

In some embodiments, only MCS's are utilized that correspond to both $N_{DBPS}$ and $N_{CBPS}$ being integers. For instance, in one embodiment, MCS entries in an MCS table are excluded from consideration when they do not correspond to both $N_{DBPS}$ and $N_{CBPS}$ being integers. In another embodiment, one MCS table is utilized, and an index to the table is interpreted differently depending on the channel bandwidth so that certain MCS entries are excluded from consideration for certain channel bandwidths. In one embodiment, the number of symbols is determined according to Equation 28 and the number of padding bits is determined according to Equation 29. Referring to FIG. 3, in one embodiment, the encoder parser 208 is configured to handle situations in which $$\frac{N_{CBPS}}{N_{ES}}$$

is not an integer, i.e., some encoders might receive fewer bits than others and thus the number of bits parsed to each encoder is not the same for all encoders. In these embodiments, fewer MCS's are excluded as compared to the constraint of Equation 27.

In other embodiments, only MCS's are utilized that correspond to both 1) $N_{ES}$ is a multiple of $N_R$; and 2) $N_{CBPS}$ is not a multiple of $N_R$. For instance, in one embodiment, MCS entries in an MCS table are excluded from consideration when they do not correspond to both 1) $N_{ES}$ is a multiple of $N_R$; and 2) $N_{CBPS}$ is not a multiple of $N_R$. An example of an MCS that is excluded in one embodiment is 256 QAM, ¾ coding rate, and with 3 binary convolutional coding encoders. This is just one example of the exclusion of a particular MCS. More generally, MCSs are excluded based particular suitable criteria related to padding, such as described above. In another embodiment, one MCS table is utilized, and an index to the table is interpreted differently depending on the channel bandwidth so that certain MCS entries are excluded from consideration for certain channel bandwidths. Thus, in these embodiments, a particular MCS is allowable for one or more first channel bandwidths, but is excluded for one or more second channel bandwidths. For example, a particular MCS is allowable for a 120 MHz channel bandwidth, but is excluded for 80 MHz and 160 MHz bandwidths. This is merely an example, and other MCSs are allowable with another set of one or more first channel bandwidths but excluded for another set of one or more second channel bandwidths.

Figure 14:
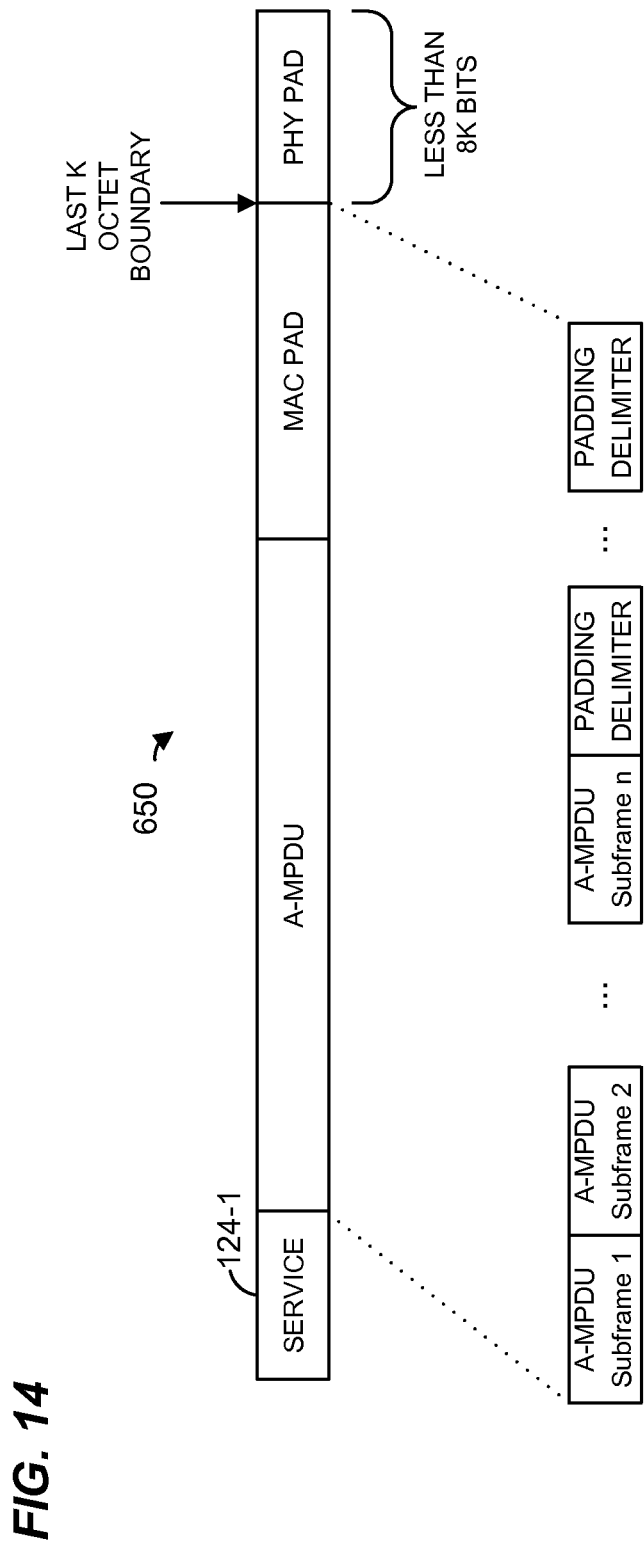
FIG. 14 is a diagram of an example aggregated media access control (MAC) layer data unit with MAC layer padding and PHY padding.

In one embodiment, packets transmitted according to the first communication protocol have an aggregated MAC protocol data unit (A-MPDU) frame format. FIG. 14 is a diagram of an example A-MPDU 650, according to an embodiment. The A-MPDU is generated so that it is a multiple of K bytes, where K is one or four, according to some embodiments. The MAC unit 18, 28 (FIG. 1) is configured to generate the A-MPDU of FIG. 14, in one embodiment. Also, the MAC unit 18, 28 (FIG. 1) is configured to add zero, one, or more K byte MAC delimiters, according to an embodiment. The PHY unit 20, 29 (FIG. 1) is configured to add tail bits and then append padding bits (for example, of value zero) from the end of the last 32-bit boundary, according to an embodiment.

In some embodiments, independent data corresponding to different stations are transmitted simultaneously, which is hereby referred to as multi-user transmissions. See, for example, U.S. patent application Ser. No. 12/758,603, filed on Apr. 12, 2010, and entitled "Physical Layer Frame Format for WLAN," which is hereby incorporated by reference herein in its entirety; U.S. patent application Ser. No. 12/175,526, filed on Jul. 18, 2008, and entitled "Access Point with Simultaneous Downlink Transmission of Independent Data for Multiple Client Stations," which is hereby incorporated by reference herein in its entirety; and U.S. patent application Ser. No. 12/175,501, filed on Jul. 18, 2008, and entitled "Wireless Network with Simultaneous Uplink Transmission of Independent Data from Multiple Client Stations," which is hereby incorporated by reference herein in its entirety.

In some embodiments having multi-user transmissions, each packet corresponding to a particular user is padded to a length corresponding to the longest packet in the simultaneous transmission. Thus, in these embodiments, the number of padding bits for a particular user is calculated based on a number of symbols in the longest packet in the simultaneous transmission. In an example scenario with K users, this is expressed as:

$$N_{SYM}^{max} = \max(N_{SYM}^{user1}, N_{SYM}^{user2}, \ldots, N_{SYM}^{userK})$$  Equ. 30 where $N_{SYM}^{userk}$ is the number of symbols (including padding bits) required if only the packet corresponding to the k-th user were being transmitted. In an embodiment, the number of padding bits for the k-th user is then calculated based on:

$$p^{userk} = N_{SYM}^{max} N_{CBPS}^{userk} R^{userk} - (8L^{userk} + N_{service} + N_{tail} N_{ES}^{userk})$$  Equ. 31

In various embodiments, padding is performed in the PHY unit 20, 29 and/or the MAC unit 18, 28. In an embodiment in which the packet length is specified in the PHY preamble, padding is performed in the PHY unit 20, 29.

In one embodiment having multi-user transmissions, the number of symbols in the multi-user packet is chosen such that the following conditions are satisfied for all users participating in the transmission:

$(N_{SYM}^{max} - N_{SYM}^{userk})$ is a multiple of $m_{STBC}^{userk}$, and $(N_{SYM}^{max} - N_{SYM}^{userk})N_{CBPS}^{userk}$ is a multiple of $N_{ES}^{userk} D_R^{userk}$, and In a special case where $N_{CBPS}^{userk}$ is a multiple of $N_{ES}^{userk} D_R^{userk} \forall k$, the number of symbols in the multi-user packet is given by:

$$N_{SYM}^{max} = \left\lceil \frac{\max(N_{SYM}^{user1}, N_{SYM}^{user2}, \ldots, N_{SYM}^{userK})}{m_{STBC}} \right\rceil m_{STBC}$$  Equ. 32 where $m_{STBC}=1$ if none of the k users utilize STBC, and $m_{STBC}=2$ if at least one of the k users utilizes STBC. The number of padding bits for the k-th user is given by Equation 31.

As discussed above, in some embodiments, bits at the end portion of a packet are encoded with a code rate different than a code rate utilized at the remaining portion of the packet. In one embodiment, bits at the end portion of the packet are encoded at a smallest rate, e.g., a ½ convolutional code (message block length of one). In some embodiments with multi-user transmissions, the number of symbols in the multi-user packet is given by Equation 32, and the number of padding bits for the k-th user is given by:

$$p^{userk} = \left( \left\lceil \frac{N_{SYM}^{max} N_{CBPS}^{userk}}{N_{ES}^{userk} D_R^{userk}} \right\rceil N_R^{userk} N_{ES}^{userk} + \frac{\mod\left(\frac{N_{SYM}^{max} N_{CBPS}^{userk}}{N_{ES}^{userk}}, D_R^{userk}\right)}{2} N_{ES}^{userk} \right) -$$
$$(8L^{userk} + N_{service} + N_{tail} N_{ES}^{userk})$$  Equ. 33

As discussed above, in some embodiments, padding bits are added after encoding, such as when a preamble of a packet includes an indicator of the number of bits in the packet. In some embodiments with multi-user transmissions, the number of symbols in the multi-user packet is given by Equation 32, and the number of padding bits (after encoding) for the k-th user is given by:

$$p_{after}^{userk} = N_{SYM}^{max} N_{CBPS}^{userk} - \left( \left\lceil \frac{8L + N_{service} + N_{tail} N_{ES}^{userk}}{N_{ES}^{userk} D_R^{userk}} \right\rceil \right) N_{ES}^{userk} D_R^{userk}$$  Equ. 34

In these embodiments, the packet length of each user packet is specified separately in portions of the PHY preambles corresponding to the users (e.g., in the VHT-SIG fields corresponding to the users). The number of padding bits before encoding is provided by Equation 26, in an embodiment.

In one embodiment, MAC padding is utilized for multi-user transmissions, and PHY padding is used for single-user transmissions.

In some embodiments of padding techniques such as discussed above, some techniques may result in an excessive number of padding bits and/or dummy OFDM symbols for certain MCS and number of FEC encoders combinations. In some embodiments, such combinations are avoided by excluding certain MCS and number of FEC encoders combinations from use by the PHY unit 19, 29. For example, if a table of MCS and number of FEC encoders entries, certain entries are excluded, in an embodiment. In another embodiment, one MCS table is utilized, and an index to the table is interpreted differently depending on the channel bandwidth so that certain MCS entries are excluded from consideration for certain channel bandwidths. For instance, in one embodiment, only MCS's are considered for use in which $\frac{N_{CBPS}}{N_{ES}}$, $N_{DBPS}$, $\frac{N_{CBPS}}{N_{P\_OUT} R}$ and $\frac{N_{CBPS}}{N_{ES} N_{P\_OUT}}$ are integers, where $N_{P\_OUT}$ is the number of bits output by the puncturing block of the FEC encoder. In other embodiments, other suitable conditions are utilized to exclude MCS and number of FEC encoders combinations to avoid excessive numbers of padding bits and/or dummy OFDM symbols.

In some embodiments, the type of padding is different based on the bandwidth of the packet. For example, in embodiments that utilize an MCS table, the set of allowed MCS entries is dependent on the packet bandwidth. In other embodiments, some MCS's are excluded for multi-user packets, whereas the same MCS's are allowed, at least for some packet bandwidths, for single user packets. In some embodiments utilizing multi-user transmissions, different MCS's are allowed based on the number of users. In some embodiments that utilize an MCS table, the set of allowed MCS entries is dependent on the packet bandwidth, whether the transmission is part of a multi-user transmission, and/or the number of users in a multi-user transmission. In another embodiment, one MCS table is utilized, and an index to the table is interpreted differently depending on the channel bandwidth, whether the transmission is part of a multi-user transmission, and/or the number of users in a multi-user transmission, so that certain MCS entries are excluded from consideration for certain combinations of channel bandwidth, whether the transmission is part of a multi-user transmission, and/or the number of users in a multi-user transmission.

In some embodiments and scenarios, the bits output by the puncturing block of an FEC encoder lie at an OFDM symbol boundary and overlap with the next OFDM symbol. This is different than in the IEEE 802.11n Standard, where $N_{CBPS}$ is always a multiple of $N_{P\_OUT}$. In these embodiments, the receiver PHY unit is configured to handle bits output by the puncturing block of an FEC encoder lie at an OFDM symbol boundary and overlap with the next OFDM symbol, which requires suitable buffering capability in some embodiments.

As discussed above, in some embodiments, $N_{tail}$ is six. In some embodiments, $N_{tail}$ is a suitable value other than six. For example, in some embodiments, $N_{tail}$ is zero.

In some embodiments, $N_{service}$ is the same as specified in the IEEE 802.11n Standard. In other embodiments, $N_{service}$ is a suitable value other than as specified in the IEEE 802.11n Standard.

In some embodiments, the padding bits are placed before the tail bits, and padding bits and tail bits are scrambled together. In other embodiments, all or a portion of padding bits are placed after the tail bits. With multiple FEC encoders and when all or a portion of padding bits are placed after the tail bits, the encoder parser 208 (FIG. 3) is configured to distribute padding bits equally amongst the FEC encoders 212, according to an embodiment.

In one embodiment, for OFDM symbols with 234 tones per 80 MHz, and 450 Mbps data rate per encoder, the MCS (64-QAM, ¾, $N_{SS}=3$, $N_{ES}=2$) is excluded for 80 MHz channels and 160 MHz channels, but is allowed for 120 MHz channels. This is just one example of the exclusion of a particular MCS. More generally, MCSs are excluded based particular suitable criteria related to padding, such as described above. In another embodiment, some 256-QAM rates are excluded for 120 MHz and 160 MHz channels.

In one embodiment, an MCS combination is excluded for all 20/40/80/120/160 channel bandwidths as long as the MCS combination violates an exclusion rule for at least one of the 20/40/80/120/160 channel bandwidths. In another embodiment, a single MCS table is shared for all of or at least multiple ones of 20/40/80/120/160 channel bandwidths, but the MCS index is interpreted differently for different combinations of one or more of channel bandwidths, whether the transmission is part of a multi-user transmission, and/or the number of users in a multi-user transmission.

In one embodiment, the MAC unit 18, 28 computes $N_{SYM}$ and p (the number of padding bits). Then, the MAC unit 18, 28 pads to k-bit boundary (e.g., k=8 or 32) of the overall p padding bits (e.g., pad bits set to zero or some other suitable value or set of values). The MAC unit 18, 28 sends a signal to the PHY unit 19, 29 (e.g., by a TxVector) that indicates the PHY unit 19, 29 is to add remaining padding bits. In this embodiment, BCC tail bits are inserted after padding bits.

Stream Parser

Referring again to FIG. 3, the stream parser 216 divides encoded bit streams into individual spatial streams, which are then separately interleaved and mapped into constellation points, according to an embodiment. In one embodiment, the stream parser 216 operates in a manner similar to the stream parser specified in the IEEE 802.11n Standard. In one embodiment, the stream parser uses the output of each FEC encoder 212 in a round robin fashion using S bits from each FEC encoder 212 each cycle, where:

$$S = \sum_{i=1}^{N_{SS}} \max\left\{1, \frac{N_{BPSCS}(i_{SS})}{2}\right\} \quad \text{Equ. 35}$$

where $N_{BPSCS}(i_{SS})$ is the number of coded bits per carrier for spatial stream $i_{SS}$.

Interleaver

In an embodiment, each interleaver 220 divides the bits per symbol in each spatial stream into blocks of size $N_{ROW} \times N_{COL}$. In one embodiment, bits in EACH block are entered into a matrix of size $N_{ROW} \times N_{COL}$ on a row by row basis and read out along the columns of the matrix. This operation is represented by:

$$i = N_{ROW}(k \bmod N_{COL}) + \text{floor}(k/N_{COL}) \ k=0,1,\ldots, N_{CBPSS}(i_{SS})-1 \quad \text{Equ. 36}$$

where i and k represent the output and input bit indices, and $N_{CBPSS}(i_{SS})$ is the number of coded bits per symbol for the i-th spatial stream, as defined in the IEEE 802.11n Standard.

In another embodiment, in order to map adjacent coded bits to less and more significant constellation bits, the interleaver operation is represented by:

$$j = s(i_{SS})\text{floor}(i/s(i_{SS})) + \left(i + N_{CBPSS}(i_{SS}) - \text{floor}\left(\frac{iN_{COL}}{N_{CBPSS}(i_{SS})}\right)\right) \bmod s(i_{SS})$$

$$i = 0, 1, \ldots, N_{CBPSS}(i_{SS}) - 1 \quad \text{Equ. 37}$$

where j and i represent the output and input bit indices.

In yet another embodiment, in order to separate adjacent coded bits in the spatial domain, each stream is cyclically rotated via a frequency rotation parameter $N_{ROT}$:

$$r = \left(j - \left(((i_{SS}-1)2)\bmod 3 + 3\ \text{floor}\left(\frac{i_{SS}-1}{3}\right)\right)N_{ROT}N_{BPSCS}(i_{SS})\right)$$

$$\bmod N_{CBPSS}(i_{SS})$$

$$j = 0, 1, \ldots, N_{CBPSS}(i_{SS}) - 1 \quad \text{Equ. 38}$$

In still another embodiment, in order to separate adjacent coded bits in the spatial domain, each stream is cyclically rotated via a frequency rotation parameter $N_{ROT}$:

$$r = (j - f(i_{SS}, N_{SS})N_{ROT}N_{BPSCS}(i_{SS})) \bmod N_{CBPSS}(i_{SS}) \ j=0, 1, \ldots, N_{CBPSS}(i_{SS})-1 \quad \text{Equ. 39}$$

where f ($i_{SS}$, $N_{SS}$) is a suitable function of both the spatial stream index and the total number of spatial streams.

In one embodiment, f($i_{SS}$, $N_{SS}=8$) is given by Table 1.

TABLE 1

| $i_{SS}$ | 1 | 2 | 3 | 4 | 5 | 6 | 7 | 8 |
|---|---|---|---|---|---|---|---|---|
| f ($i_{SS}$, $N_{SS}$ = 8) | 0 | 3 | 6 | 1 | 4 | 7 | 2 | 5 |

In another embodiment, f($i_{SS}$, $N_{SS}=6$) is given by Table 2.

TABLE 2

| $i_{SS}$ | 1 | 2 | 3 | 4 | 5 | 6 |
|---|---|---|---|---|---|---|
| f ($i_{SS}$, $N_{SS}$ = 6) | 0 | 2 | 4 | 1 | 5 | 3 |

For a given tone mapping, interleaver parameters are the number of rows, $N_{ROW}$, the number of columns, $N_{COL}$, and the frequency rotation parameter, $N_{ROT}$, according to an embodiment. In one embodiment, the values of $N_{ROW}$ and $N_{COL}$ satisfy the relationship:

$$N_{ROW} N_{COL} = N_{VHT\text{-}Data}^{Tone} N_{BPSCS}(i) \quad \text{Equ. 40}$$

for any i where $N_{VHT\text{-}Data}^{Tone}$ is the number of data tones, and $N_{BPSCS}(i)$ is the number of coded bits per carrier for the i-th spatial stream. FIG. 15 is a table providing some example values for the interleaver parameters, according to one embodiment.

In some embodiments, $N_{ROT}$ varies depending on the number of streams. For example, in one embodiment:

$$N_{ROT} = g(N_{SS}) \quad \text{Equ. 41}$$

where $g(N_{SS})$ is a function of the number of spatial streams. In one embodiment:

$$N_{ROT} = \frac{N_{VHT\text{-}Data}^{Tone}}{N_{SS}} \quad \text{Equ. 42}$$

In another embodiment:

$$N_{ROT} = \frac{N_{VHT\text{-}Data}^{Tone}}{N_{SS}} + c \quad \text{Equ. 43}$$

where c is a suitable integer constant.

Examples of $N_{ROT}$ values for five to eight spatial streams, according to an embodiment, is provided in the table of FIG. 16.

In the IEEE 802.11n Standard, $N_{COL}$ is the same for all modulation schemes (i.e., independent of constellation size) while $N_{ROW}$ is a linear function of constellation size. In one embodiment, both $N_{COL}$ and $N_{ROW}$ vary as the modulation scheme varies. In other words, $N_{COL}$ will have at least two different values depending on the particular modulation scheme, and $N_{ROW}$ will have at least two different values depending on the particular modulation scheme. For example, in one embodiment, both $N_{COL}$ and $N_{ROW}$ vary as the constellation size varies. In other words, $N_{COL}$ will have at least two different values depending on the particular constellation size, and $N_{ROW}$ will have at least two different values depending on the particular constellation size. In one embodiment, $N_{COL}$ and $N_{ROW}$ are defined as:

$$N_{ROW} = f_1(N_{BPSCS}(i)) \quad \text{Equ. 44}$$

$$N_{COL} = f_2(N_{BPSCS}(i)) \quad \text{Equ. 45}$$

where $f_1$ and $f_2$ are mappings defined from $N_{BPSCS}(i)$ to arbitrary numbers such that:

$$N_{COL} = N_{VHT\text{-}Data}^{Tone} N_{BPSCS}(i) \quad \text{Equ. 46}$$

In one embodiment, $f_1$ and $f_2$ are non-linear functions. An example for eight pilot tones in an 80 MHz channel (assuming 234 data tones), according to an embodiment, is provided in Table 3.

TABLE 3

| $N_{BPSCS}(i)$ | $N_{ROW}, N_{COL}$ |
|---|---|
| 1 (BPSK) | (18, 13) |
| 2 (QPSK) | (36, 13) |

TABLE 3-continued

| $N_{BPSCS}(i)$ | $N_{ROW}, N_{COL}$ |
|---|---|
| 4 (16-QAM) | (36, 26) |
| 6 (64-QAM) | (54, 26) |
| 8 (256-QAM) | (72, 26) |

The example of Table 3 illustrates that $N_{ROW}$ sometimes is the same for different size constellations (e.g., QPSK and 16-QAM). In particular, $N_{ROW}$ has four different values for five different constellation sizes. The example of Table 3 also illustrates that $N_{COL}$ sometimes varies for different size constellations (e.g., BPSK/QPSK versus 16-QAM/64-QAM/256-QAM). In particular, $N_{COL}$ has two different values for five different constellation sizes. In one specific example, in an 80 MHz channel (assuming 234 data tones), $N_{ROW}, N_{COL}$ is $(9*N_{BPSCS}(i_{SS}), 26)$. In another example, an 80 MHz channel (assuming 234 data tones), $N_{ROW}, N_{COL}$ is $(6*N_{BPSCS}(i_{SS}), 39)$.

Figure 17:
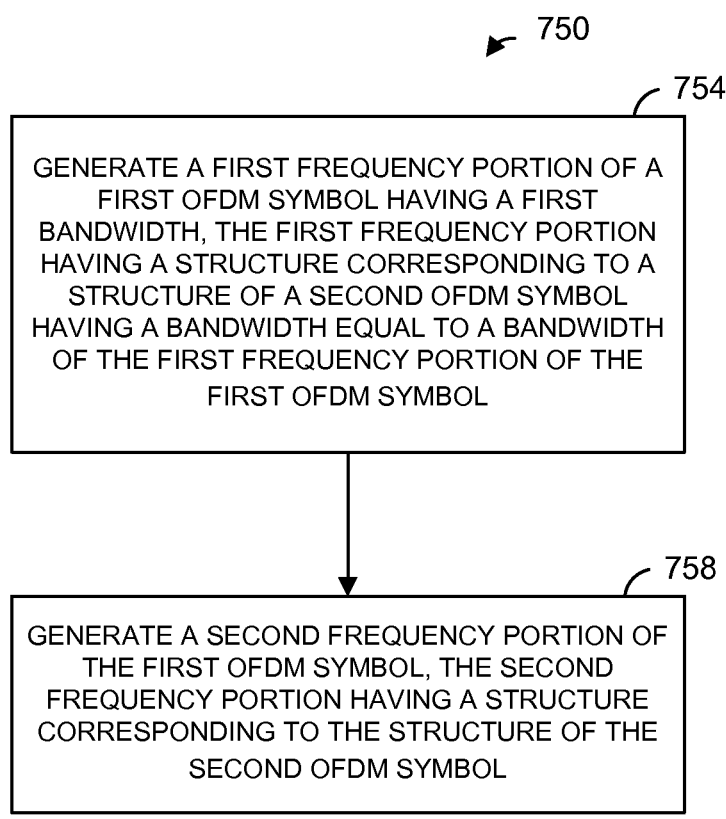
FIG. 17 is a flow diagram of an example method for generating a OFDM symbol, according to an embodiment.

FIG. 17 is a flow diagram of an example method 750 for generating a first OFDM symbol for transmission via a communication channel having a first bandwidth, according to an embodiment. The PHY unit 20, 29 (FIG. 1) is configured to implement the method 750, in one embodiment. Similarly, the PHY unit 200 (FIG. 3) is configured to implement the method 750, in another embodiment. In other embodiments, another suitable PHY unit is configured to implement the method 750.

The method 750 of FIG. 17 will be described with respect to FIGS. 5B, 7A, and 7B for ease of explanation. OFDM symbols generated according to the method 750, however, need not have the example OFDM symbol structure of FIG. 5B, 7A, or 7B.

At block 754, a first frequency portion of the first OFDM symbol is generated, where the first frequency portion of the first OFDM symbol has a structure corresponding to a structure of a second OFDM symbol having a bandwidth equal to a bandwidth of the first frequency portion of the first OFDM symbol. For example, the first frequency portion of the first OFDM symbol has guard tones, null tones, and direct current (DC) tones that correspond to guard tones and DC tones of the second OFDM symbol, in an embodiment. Referring to FIGS. 5B and 7A, the OFDM symbol 330 has a bandwidth of 40 MHz and is for transmission in a 40 MHz wide communication channel, whereas the OFDM symbol 390 has a bandwidth of 80 MHz and is for transmission in an 80 MHz wide communication channel. The lower half (in frequency) of the OFDM symbol 390 has a structure that corresponds to the structure of the OFDM symbol 330. For example, the lower (in frequency) guard tones of the OFDM symbol 390 correspond to the lower (in frequency) guard tones of the OFDM symbol 330. The guard tones at indexes −5 through −1 of the OFDM symbol 390 correspond to the upper (in frequency) guard tones of the OFDM symbol 330. The three null tones of the lower (in frequency) half of the OFDM symbol 390 correspond to the DC tones of the OFDM symbol 330.

Referring now to FIGS. 5B and 7B, the lower 40 MHz sideband of the OFDM symbol 410 has a structure that corresponds to the structure of the OFDM symbol 330 in a manner similar to that described above with respect to FIGS. 5B and 7A.

At block 758, a second frequency portion of the first OFDM symbol is generated, where the second frequency portion of the first OFDM symbol has a structure corresponding to the structure of the second OFDM symbol. For example, the second frequency portion of the first OFDM symbol has guard tones, null tones, and direct current (DC) tones that correspond to guard tones and DC tones of the second OFDM symbol. Referring to FIGS. 5B and 7A, the OFDM symbol 330 has a bandwidth of 40 MHz and is for transmission in a 40 MHz wide communication channel, whereas the OFDM symbol 390 has a bandwidth of 80 MHz and is for transmission in an 80 MHz wide communication channel. The upper half (in frequency) of the OFDM symbol 390 has a structure that corresponds to the structure of the OFDM symbol 330. For example, the upper (in frequency) guard tones of the OFDM symbol 390 correspond to the upper (in frequency) guard tones of the OFDM symbol 330. The guard tones at indexes 0 through 5 of the OFDM symbol 390 correspond to the lower (in frequency) guard tones of the OFDM symbol 330. The three null tones of the upper (in frequency) half of the OFDM symbol 390 correspond to the DC tones of the OFDM symbol 330.

Referring now to FIGS. 5B and 7B, the upper 40 MHz sideband of the OFDM symbol 410 has a structure that corresponds to the structure of the OFDM symbol 330 in a manner similar to that described above with respect to FIGS. 5B and 7A.

As another example, a 160 MHz bandwidth OFDM symbol can be generated according to an embodiment of the method 750 based on the structure of an 80 MHz OFDM symbol such as any one of the example OFDM symbols of FIGS. 6A, 6B, and 7A.

In another embodiment, the method 750 further includes generating a third frequency portion of the first OFDM symbol, where the third frequency portion of the first OFDM symbol has a structure corresponding to the structure of the second OFDM symbol. For example, a 120 MHz bandwidth OFDM symbol can be generated, according to an embodiment of the method 750, having three portions based on the structure of a 40 MHz OFDM symbol such as any either of the example OFDM symbols of FIGS. 5A and 5B.

In other embodiments, the method 750 further includes generating at least a fourth frequency portion of the first OFDM symbol in a manner similar to those discussed above.

In some embodiments, the method 750 is utilized for generating non-contiguous (in frequency) OFDM symbols, whereas a different method is utilized for generating contiguous (in frequency) OFDM symbols. In these embodiments, an upper portion and a lower portion of a contiguous OFDM symbol need not have a structure that corresponds to another OFDM symbol having the same bandwidth as the portion.

Figure 18:
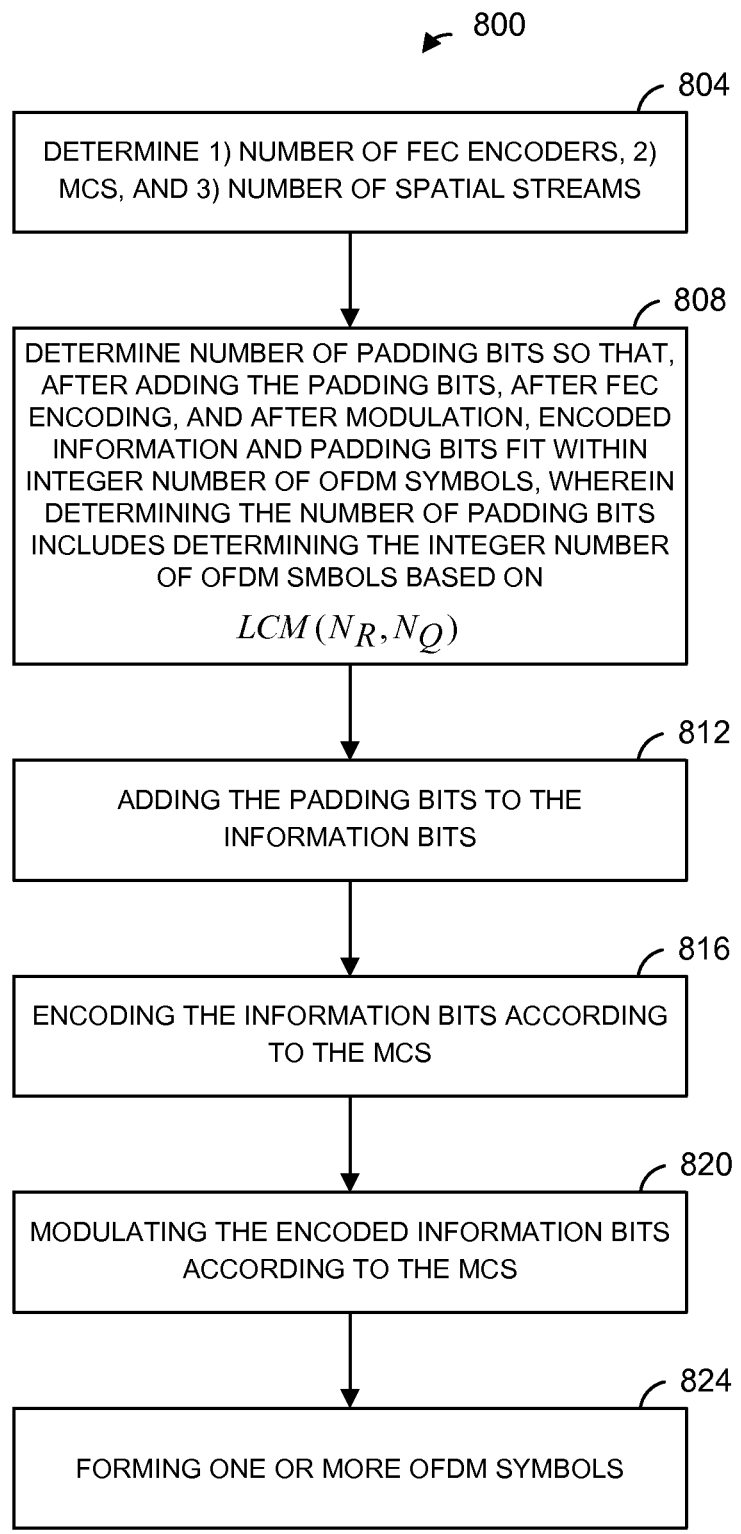
FIG. 18 is a flow diagram of an example method for generating OFDM symbols, according to an embodiment.

FIG. 18 is a flow diagram of an example method 800 for generating a PHY data unit for transmission via a communication channel, according to an embodiment. The PHY unit 20, 29 (FIG. 1) is configured to implement the method 800 at least partially, in one embodiment. Similarly, the PHY unit 200 (FIG. 3) is configured to implement the method 800 at least partially, in another embodiment. In other embodiments, another suitable PHY unit is configured to implement the method 800 at last partially.

At block 804, 1) a number of FEC encoders, 2) an MCS, and 3) a number of spatial streams to be utilized in transmitting the PHY data unit are determined. At block 808, a number of padding bits is determined so that, after adding the padding bits, after FEC encoding, and after modulation, encoded information bits and padding bits fit within an integer number of OFDM symbols. Determining the number of padding bits includes determining the integer number of OFDM symbols based on LCM ($N_R$, $N_Q$). For example, the number of OFDM symbols is determined according to one or more of Equations 16, 19, 21, and 22, according to some embodiments, or another suitable equation. After determining the number of OFDM symbols, the number of padding bits is determined according Equation 17, in an embodiment, or another suitable equation.

At block 812, the padding bits are added to the information bits. Some or all of the padding bits are added to the information bits before encoder parsing, according to some embodiments. For instance, in one embodiment, some or all of the padding bits are added to the information bits by a padding system of the MAC unit 18, 28 (FIG. 1). In one embodiment, some or all of the padding bits are added to the information bits after encoder parsing. The block 812 is implemented at least partly by the padding system 500 (FIG. 11) or the padding system 550 (FIG. 12), in some embodiments, or by another suitable padding system.

At block 816, the information bits are encoded by the number of FEC encoders determined at block 804 and according to the MCS determined at block 804. Block 816 includes parsing the information bits to the FEC encoders. In some embodiments, a transmitter includes four or more FEC encoders, and a number of the FEC encoders to be utilized is determined based on channel conditions, capabilities of a receiver, etc., for example. In one embodiment, block 816 is implemented by the encoder parser 208 and one or more of the FEC encoders 212 (FIG. 3).

At block 820, the encoded information bits are modulated according to the MCS determined at block 804. Block 820 is implemented by one or more of the constellation mappers 224 (FIG. 3), according to an embodiment.

At block 824, one or more OFDM symbols are formed. In one embodiment, block 824 is implemented at least partially by one or more of the IDFT units 240 and one or more of the GI and window units 244 (FIG. 3).

Figure 19:
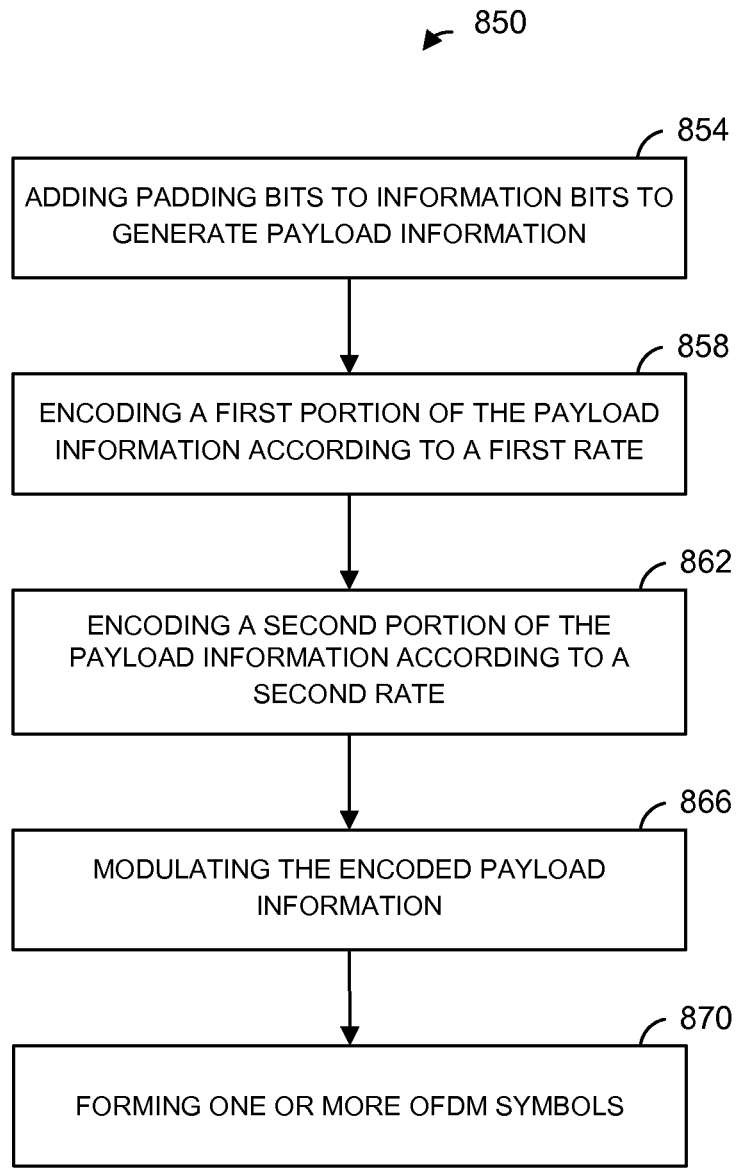
FIG. 19 is a flow diagram of another example method for generating OFDM symbols, according to another embodiment.

FIG. 19 is a flow diagram of another example method 850 for generating a PHY data unit for transmission via a communication channel, according to another embodiment. The PHY unit 20, 29 (FIG. 1) is configured to implement the method 850 at least partially, in one embodiment. Similarly, the PHY unit 200 (FIG. 3) is configured to implement the method 850 at least partially, in another embodiment. In other embodiments, another suitable PHY unit is configured to implement the method 850 at last partially.

At block 854, padding bits are added to information bits to generate payload information. Some or all of the padding bits are added to the information bits before encoder parsing, according to some embodiments. For instance, in one embodiment, some or all of the padding bits are added to the information bits by a padding system of the MAC unit 18, 28 (FIG. 1). In one embodiment, some or all of the padding bits are added to the information bits after encoder parsing. The block 854 is implemented at least partly by the padding system 500 (FIG. 11) or the padding system 550 (FIG. 12), in some embodiments, or by another suitable padding system.

At block 858, a first portion of the payload information is encoded by one or more FEC encoders according to first code rate. Block 858 includes parsing payload information to the one or more FEC encoders. In one embodiment, block 858 is implemented by the encoder parser 208 and one or more of the FEC encoders 212 (FIG. 3).

At block 862, a second portion of the payload information is encoded by one or more FEC encoders according to second code rate. In one embodiment, the second code rate is a lowest code rate of the one or more FEC encoders. In one embodiment, the second code rate is a lower code as compared to the first code rate. Block 862 includes parsing payload information to the one or more FEC encoders. In one embodiment, block 862 is implemented by the encoder parser 208 and one or more of the FEC encoders 212 (FIG. 3).

At block 866, the encoded payload information is modulated. Block 866 is implemented by one or more of the constellation mappers 224 (FIG. 3), according to an embodiment.

At block 870, one or more OFDM symbols are formed. In one embodiment, block 870 is implemented at least partially by one or more of the IDFT units 240 and one or more of the GI and window units 244 (FIG. 3).

Figure 20:
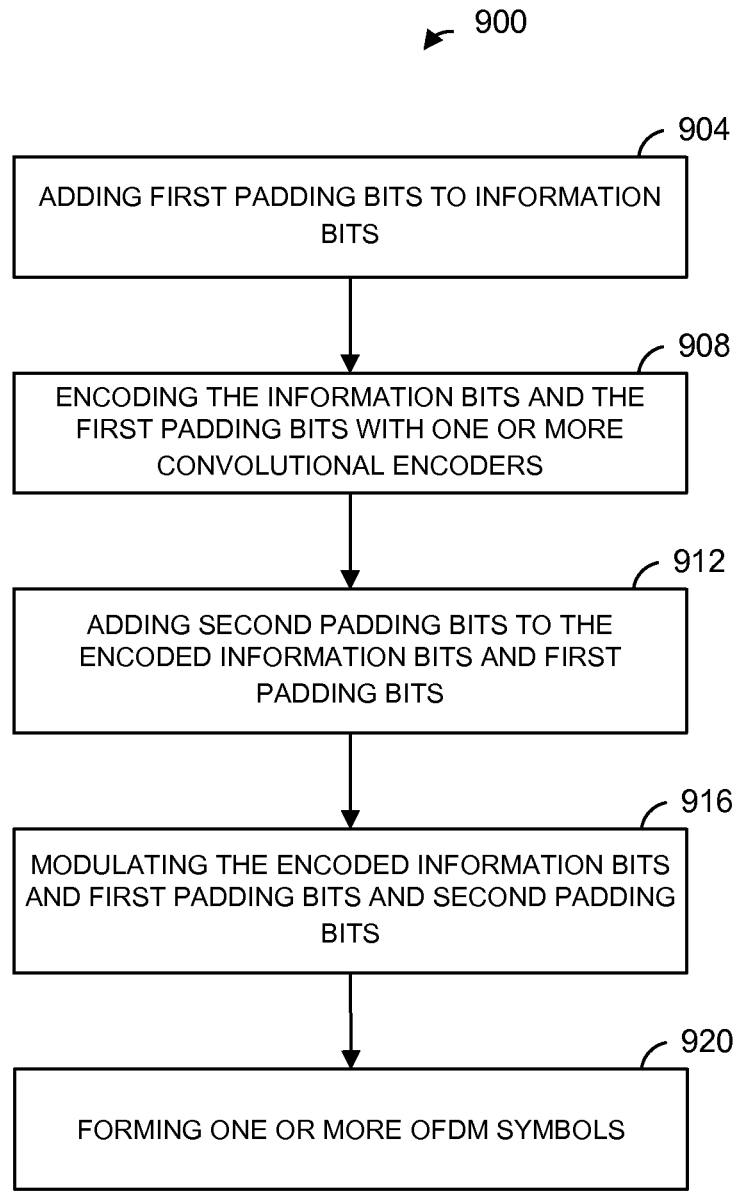
FIG. 20 is a flow diagram of another example method for generating OFDM symbols, according to another embodiment.

FIG. 20 is a flow diagram of another example method 900 for generating a PHY data unit for transmission via a communication channel, according to another embodiment. The PHY unit 20, 29 (FIG. 1) is configured to implement the method 900 at least partially, in one embodiment. Similarly, the PHY unit 200 (FIG. 3) is configured to implement the method 900 at least partially, in another embodiment. In other embodiments, another suitable PHY unit is configured to implement the method 900 at last partially.

At block 904, zero or more first padding bits are added to information bits. Some or all of the first padding bits are added to the information bits before encoder parsing, according to some embodiments. For instance, in one embodiment, some or all of the first padding bits are added to the information bits by a padding system of the MAC unit 18, 28 (FIG. 1). In one embodiment, some or all of the first padding bits are added to the information bits after encoder parsing. The block 904 is implemented at least partly by the padding system 600 (FIG. 13), in one embodiment, or by another suitable padding system. For example, block 904 is implemented by the padding unit 604, in one embodiment.

At block 908, the information bits and the zero or more first padding bits are encoded by one or more convolutional encoders. Block 908 includes parsing the information bit and the zero or more first padding bits to the one or more FEC encoders. In one embodiment, block 908 is implemented by the encoder parser 208 and one or more of the FEC encoders 212 (FIG. 3).

At block 912, second padding bits are added to the encoded information and first padding bits. Block 912 is implemented at least partly by the padding system 600 (FIG. 13), in one embodiment, or by another suitable padding system. For example, block 912 is implemented by the padding unit 612, in one embodiment.

At block 916, the encoded information bits and first padding bits and the second padding bits are modulated. Block 916 is implemented by one or more of the constellation mappers 224 (FIG. 3), according to an embodiment.

At block 920, one or more OFDM symbols are formed. In one embodiment, block 920 is implemented at least partially by one or more of the IDFT units 240 and one or more of the GI and window units 244 (FIG. 3).

Figure 21:
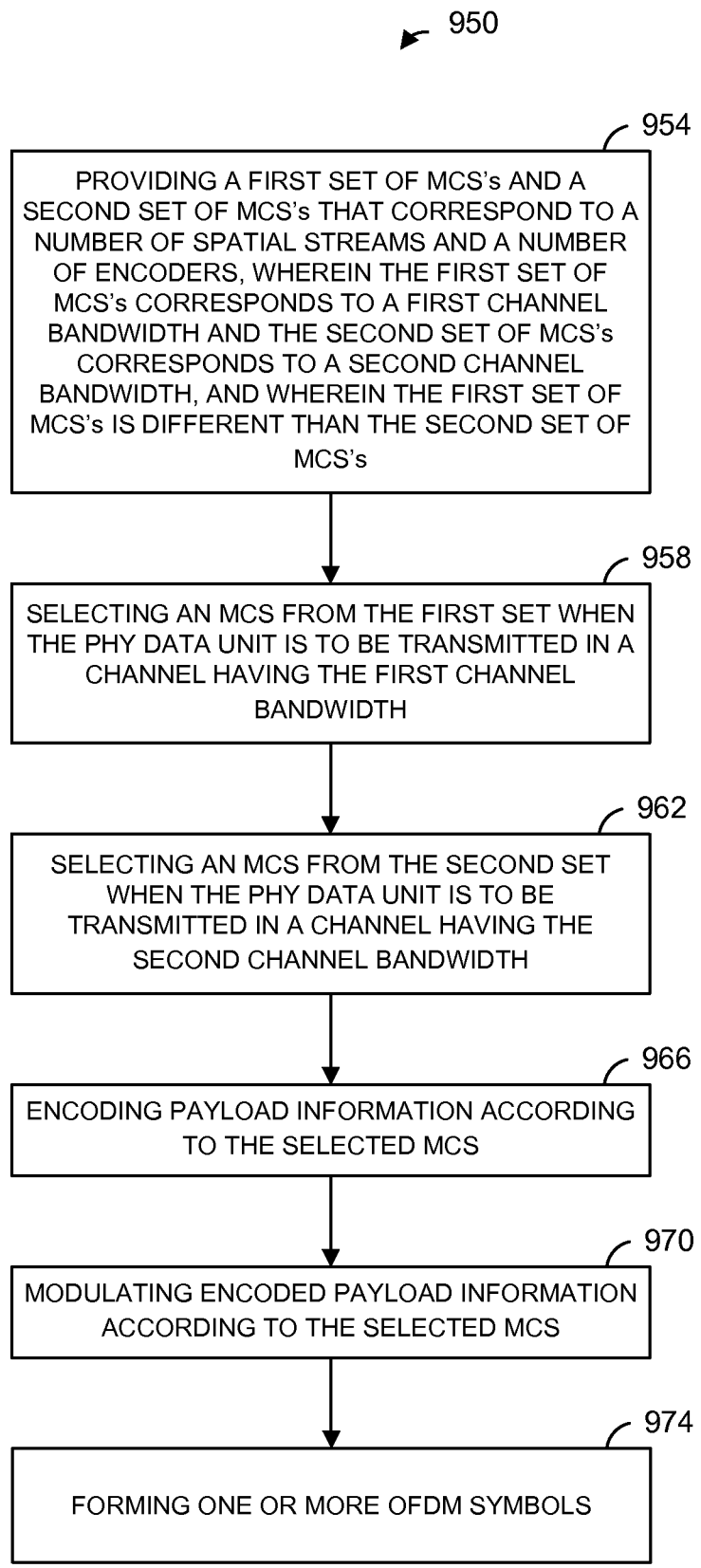
FIG. 21 is a flow diagram of another example method for generating OFDM symbols, according to another embodiment.

FIG. 21 is a flow diagram of another example method 950 for generating a PHY data unit for transmission via a communication channel, according to another embodiment. The PHY unit 20, 29 (FIG. 1) is configured to implement the method 950 at least partially, in one embodiment. Similarly, the PHY unit 200 (FIG. 3) is configured to implement the method 950 at least partially, in another embodiment. In other embodiments, another suitable PHY unit is configured to implement the method 950 at last partially.

At block 954, a first set of MCS's and a second set of MCS's are provided, where the first set and the second set both correspond to a given number of spatial streams and a given number of encoders, and where the first set corresponds to a first channel bandwidth and the second set corresponds to a second channel bandwidth. The first set is different than the second set.

In one embodiment, the first set of MCS's and the second set of MCS's are provided in separate MCS tables corresponding to different channel bandwidths. In another embodiment, the first set of MCS's and the second set of MCS's are provided in a single MCS table, and an index to the single MCS table is interpreted differently depending on the channel bandwidth to be used to transmit the PHY data unit. For example, the index to the single MCS table is interpreted to select only from the first set of MCS's when the first channel bandwidth is to be used, whereas the index to the single MCS table is interpreted to select only from the second set of MCS's when the second channel bandwidth is to be used.

In one embodiment, the first set of MCS's excludes MCS's that will result in excessive numbers of padding bits and/or dummy OFDM symbols when the first channel bandwidth is to be used, and the second set of MCS's excludes MCS's that will result in excessive numbers of padding bits and/or dummy OFDM symbols when the second channel bandwidth is to be used. In another embodiment, the first set of MCS's excludes MCS's that result in one or more padding bit-related constraints failing to be met when the first channel bandwidth is to be used, and the second set of MCS's excludes MCS's that do not satisfy the one or more padding bit-related constraints when the second channel bandwidth is to be used.

At block 958, an MCS is selected from the first set when the PHY data unit is to be transmitted in a channel having the first channel bandwidth. At block 962, an MCS is selected from the second set when the PHY data unit is to be transmitted in a channel having the second channel bandwidth.

At block 966, a payload is encoded according to the selected MCS. Block 966 includes parsing the payload to one or more FEC encoders. In one embodiment, block 966 is implemented by the encoder parser 208 and one or more of the FEC encoders 212 (FIG. 3).

At block 970, the encoded payload is modulated. Block 970 is implemented by one or more of the constellation mappers 224 (FIG. 3), according to an embodiment.

At block 974, one or more OFDM symbols are formed. In one embodiment, block 974 is implemented at least partially by one or more of the IDFT units 240 and one or more of the GI and window units 244 (FIG. 3).

Figure 22:
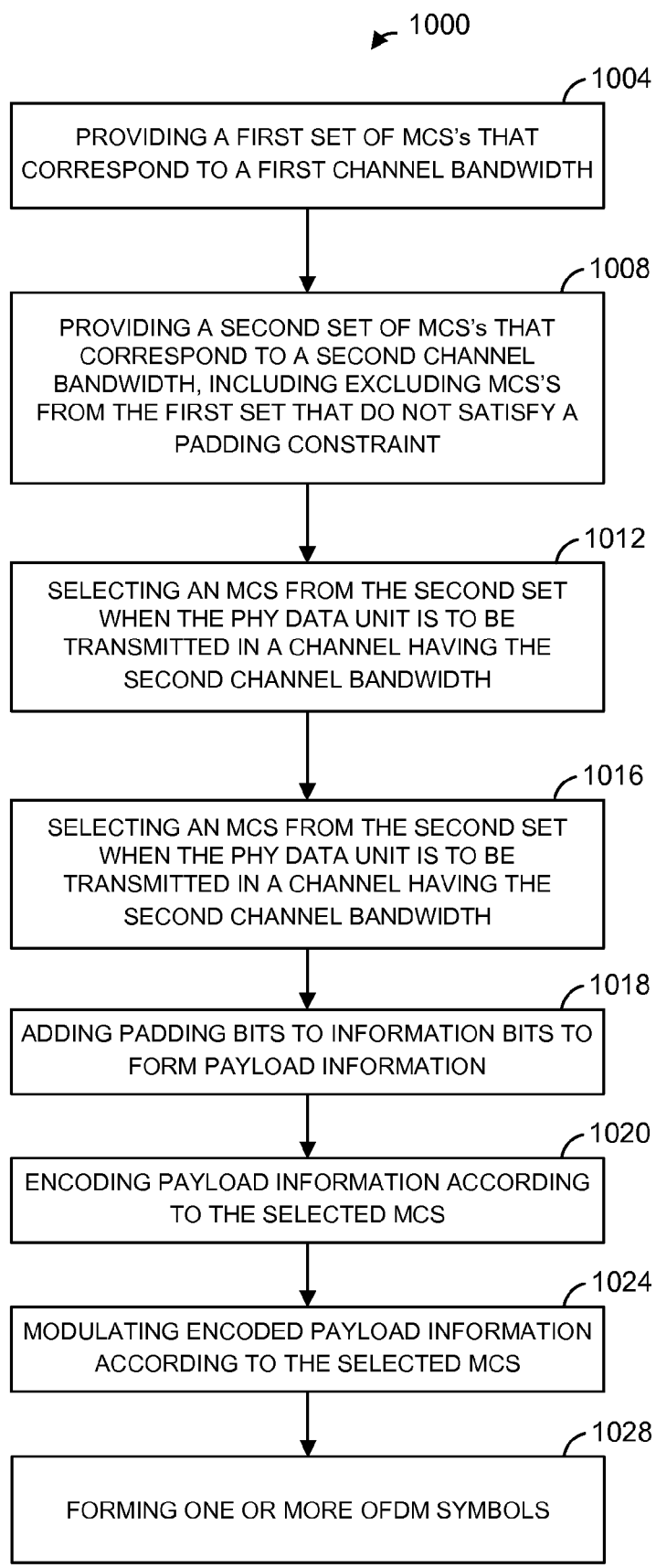
FIG. 22 is a flow diagram of another example method for generating OFDM symbols, according to another embodiment.

FIG. 22 is a flow diagram of another example method 1000 for generating a PHY data unit for transmission via a communication channel, according to another embodiment. The PHY unit 20, 29 (FIG. 1) is configured to implement the method 1000 at least partially, in one embodiment. Similarly, the PHY unit 200 (FIG. 3) is configured to implement the method 950 at least partially, in another embodiment. In other embodiments, another suitable PHY unit is configured to implement the method 950 at last partially.

At block 1004, a first set of MCS's that correspond to a first channel bandwidth is provided. At block 1008, a second set of MCS's that correspond to a second channel bandwidth is provided, wherein providing the second set of MCS's includes excluding MCS's from the first set of MCS's that do not satisfy a constraint related to padding. In one embodiment, the first set of MCS's and the second set of MCS's each exclude MCS's that do not satisfy the constraint, but one or more MCS's in the first set satisfy the constraint with respect to the first channel bandwidth, but these one or more MCS's do not satisfy the constraint with respect to the second channel bandwidth. In one embodiment, the constraint corresponds to Equ. 27 and/or the constraint is that $$\frac{N_{DBPS}}{N_{ES}}$$

and $$\frac{N_{CBPS}}{N_{ES}}$$

are integers. In another embodiment, the constraint is that both $N_{DBPS}$ and $N_{CBPS}$ are integers.

In one embodiment, the first set of MCS's and the second set of MCS's are provided in separate MCS tables corresponding to the different channel bandwidths. In another embodiment, the first set of MCS's and the second set of MCS's are provided in a single MCS table, and an index to the single MCS table is interpreted differently depending on the channel bandwidth to be used to transmit the PHY data unit. For example, the index to the single MCS table is interpreted to select only from the first set of MCS's when the first channel bandwidth is to be used, whereas the index to the single MCS table is interpreted to select only from the second set of MCS's when the second channel bandwidth is to be used.

In one embodiment, the first set of MCS's excludes MCS's that will result in excessive numbers of padding bits and/or dummy OFDM symbols when the first channel bandwidth is to be used, and the second set of MCS's excludes MCS's that will result in excessive numbers of padding bits and/or dummy OFDM symbols when the second channel bandwidth is to be used. In another embodiment, the first set of MCS's excludes MCS's that result in one or more padding bit-related constraints failing to be met when the first channel bandwidth is to be used, and the second set of MCS's excludes MCS's that do not satisfy the one or more padding bit-related constraints when the second channel bandwidth is to be used.

At block 1012, an MCS is selected from the first set when the PHY data unit is to be transmitted in a channel having the first channel bandwidth. At block 1016, an MCS is selected from the second set when the PHY data unit is to be transmitted in a channel having the second channel bandwidth.

At block 1018, padding bits are added to information bits to generate payload information.

At block 1020, the payload information is encoded according to the selected MCS. Block 1020 includes parsing the payload to one or more FEC encoders. In one embodiment, block 1020 is implemented by the encoder parser 208 and one or more of the FEC encoders 212 (FIG. 3). In some embodiments, padding bits are added after encoding.

At block 1024, the encoded payload is modulated. Block 1024 is implemented by one or more of the constellation mappers 224 (FIG. 3), according to an embodiment.

At block 1028, one or more OFDM symbols are formed. In one embodiment, block 1028 is implemented at least partially by one or more of the IDFT units 240 and one or more of the GI and window units 244 (FIG. 3).

Figure 23:
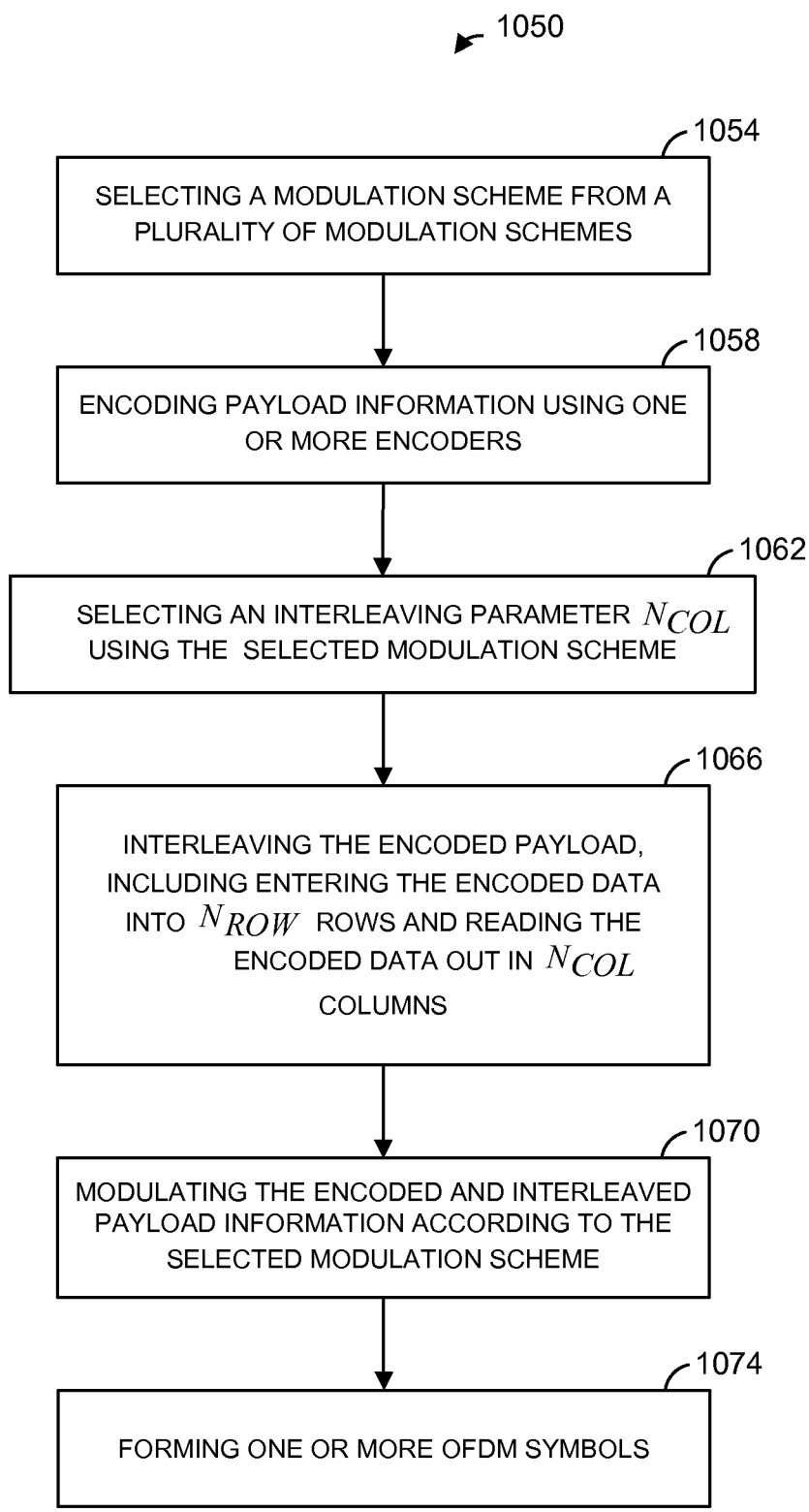
FIG. 23 is a flow diagram of another example method for generating OFDM symbols, according to another embodiment.

FIG. 23 is a flow diagram of another example method 1050 for generating a PHY data unit for transmission via a communication channel, according to another embodiment. The PHY unit 20, 29 (FIG. 1) is configured to implement the method 1050 at least partially, in one embodiment. Similarly, the PHY unit 200 (FIG. 3) is configured to implement the method 1050 at least partially, in another embodiment. In other embodiments, another suitable PHY unit is configured to implement the method 1050 at last partially.

At block 1054, a modulation scheme is selected from a set of possible modulation schemed that can be utilized.

At block 1058, payload information is encoded. Block 1058 includes parsing the payload information to one or more FEC encoders. In one embodiment, block 1058 is implemented by the encoder parser 208 and one or more of the FEC encoders 212 (FIG. 3).

At block 1062, the interleaving parameter $N_{COL}$ is selected from a plurality of different values. $N_{COL}$ is selected using or based on the selected modulation scheme. For example, for a given channel bandwidth, $N_{COL}$ may be different for different constellation sizes, according to an embodiment.

At block 1066, the encoded payload information is interleaved, which includes entering encoded data into $N_{ROW}$ and reading the encoded data out in $N_{COL}$ columns. Block 1066 is implemented by one or more of the interleavers 220 (FIG. 3), according to an embodiment.

At block 1070, the encoded and interleaved payload information is modulated according to the selected modulation scheme. Block 1070 is implemented by one or more of the constellation mappers 224 (FIG. 3), according to an embodiment.

At block 1074, one or more OFDM symbols are formed. In one embodiment, block 1024 is implemented at least partially by one or more of the IDFT units 240 and one or more of the GI and window units 244 (FIG. 3).

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustra-

What is claimed is:

1. A method, implemented in a communication device, for generating a physical layer (PHY) data unit for transmission via a communication channel, the method comprising:
   selecting, in the communication device, a modulation scheme from a plurality of modulation schemes;
   encoding, in the communication device, information bits to generate encoded data using one or more encoders;
   selecting, in the communication device, a number of spatial streams $N_{SS}$;
   parsing, in the communication device, the encoded data into the number of spatial streams $N_{SS}$;
   selecting, in the communication device, a first interleaving parameter $N_{COL}$;
   selecting, in the communication device, a second interleaving parameter $N_{ROT}$ using the selected number of spatial streams $N_{SS}$, wherein $N_{ROT}$ varies for different numbers of spatial streams;
   interleaving, in the communication device, the encoded data, including entering the encoded data into a matrix having an integer number of rows equal to $N_{ROW}$ and an integer number of columns equal to $N_{COL}$, reading the encoded data out in the $N_{COL}$ columns, and applying a frequency rotation r according to $$r=(j-f*N_{ROT}*N_{BPSCS}(i_{SS})) \bmod N_{CBPSS}(i_{SS})$$

where $i_{SS}$ is a spatial stream index, $N_{CBPSS}(i_{SS})$ is a number of coded bits per symbol for an $i_{SS}$-th spatial stream, $N_{BPSCS}(i_{SS})$ is a number of coded bits per subcarrier for the $i_{SS}$-th spatial stream, $j=0, 1, \ldots, N_{CBPSS}(i_{SS})-1$, and f is an integer that varies based on the spatial stream index $i_{SS}$;
   modulating, in the communication device, payload information of the PHY data unit according to the modulation scheme, wherein the payload information includes the interleaved encoded data; and
   forming, in the communication device, a plurality of orthogonal frequency division multiplex (OFDM) symbols based on the modulated payload information.

2. The method of claim 1, further comprising:
   selecting, in the communication device, the parameter $N_{ROW}$ using the selected modulation scheme, wherein $N_{ROW}$ is the same for some modulation schemes.

3. The method of claim 1, wherein $N_{ROW}*N_{COL}=N^{Tone}*N_{BPSCS}(i_{SS})$ holds for all $i_{SS}$, where $N^{Tone}$ is a number of data tones, and where $N_{BPSCS}(i_{SS})$ is a number of coded bits per subcarrier for an $i_{SS}^{th}$ spatial stream.

4. The method of claim 1, wherein $N_{ROT}=(N^{Tone}/N_{SS})+C$, where $N^{Tone}$ is a number of data tones, and where C is either zero or a non-zero integer constant.

5. The method of claim 1, wherein:
   encoding information bits to generate encoded data using one or more encoders includes encoding the information bits to generate binary convolutional code (BCC) encoded data using one or more BCC encoders; and
   interleaving the encoded data includes interleaving the BCC encoded data.

6. The method of claim 1, wherein f is an integer function of the spatial stream index $i_{SS}$ and the number of spatial streams $N_{SS}$.

7. A physical layer (PHY) apparatus for generating a PHY data unit for transmission via a communication channel, the PHY apparatus comprising:
   a memory configured to store indicators of a plurality of modulation schemes,
   wherein the PHY apparatus is configured to (i) select a modulation scheme from the plurality of modulation schemes, (ii) select a first interleaving parameter $N_{COL}$ (iii) select a number of spatial streams $N_{SS}$ and (iv) select a second interleaving parameter $N_{ROT}$ using the selected number of spatial streams $N_{SS}$, wherein $N_{ROT}$ is an integer that varies for different numbers of spatial streams,
   wherein the PHY apparatus further comprises
   one or more encoders configured to encode information bits to generate encoded data,
   a stream parser configured to parse the encoded data into the number of spatial streams $N_{SS}$,
   an interleaver configured to interleave the encoded data, including entering the encoded data into a matrix having an integer number of rows equal to $N_{Row}$ and an integer number of columns equal to $N_{COL}$, reading the encoded data out in $N_{COL}$ columns, and applying a frequency rotation r according to $$r=(j-f*N_{ROT}*N_{BPSCS}(i_{SS})) \bmod N_{CBPSS}(i_{SS})$$

where $i_{SS}$ is a spatial stream index, $N_{CBPSS}(i_{SS})$ is a number of coded bits per symbol for an $i_{SS}$-th spatial stream, $N_{BPSCS}(i_{SS})$ is a number of coded bits per subcarrier for the $i_{SS}$-th spatial stream, $j=0, 1, \ldots, N_{CBPSS}(i_{SS})-1$, and f is an integer that varies based on the spatial stream index $i_{SS}$, and
   one or more modulators configured to modulate the encoded data from the interleaver according to the selected modulation scheme, and
   wherein the PHY apparatus is configured to form a plurality of OFDM symbols based on the modulated encoded data.

8. The PHY apparatus of claim 7, wherein the PHY apparatus is configured to select the parameter $N_{ROW}$ using the selected modulation scheme, and wherein $N_{ROW}$ is the same for some modulation schemes.

9. The PHY apparatus of claim 7, wherein $N_{ROW}*N_{COL}=N^{Tone}*N_{BPSCS}(i_{SS})$ holds for all $i_{ss}$, where $N^{Tone}$ is a number of data tones, and where $N_{BPSCS}(i_{SS})$ is a number of coded bits per subcarrier for an $i_{SS}^{th}$ spatial stream.

10. The PHY apparatus of claim 7, wherein $N_{ROT}=(N^{Tone}/N_{SS})+C$, where $N^{Tone}$ is a number of data tones, and where C is either zero or a non-zero integer constant.

11. The PHY apparatus of claim 7, wherein the one or more encoders are binary convolutional code (BCC) encoders.

12. The PHY apparatus of claim 7, wherein f is an integer function of the spatial stream index $i_{SS}$ and the number of spatial streams $N_{SS}$.

13. A tangible, non-transitory, computer-readable medium storing instructions that, when executed by one or more processors, cause the one or more processors to:
   select a modulation scheme from a plurality of modulation schemes;
   encode information bits to generate encoded data using one or more encoders;
   select a number of spatial streams $N_{SS}$;
   parse the encoded data into the number of spatial streams $N_{SS}$;
   select a first interleaving parameter $N_{COL}$; select a second interleaving parameter $N_{ROT}$ using the selected number of spatial streams $N_{SS}$, wherein $N_{ROT}$ is an integer that varies for different numbers of spatial streams;
   interleave the encoded data, including entering the encoded data into a matrix having an integer number of rows equal to $N_{Row}$ and an integer number of columns equal to $N_{COL}$, reading the encoded data out in $N_{COL}$ columns, and applying a frequency rotation r according to $$r=(j-f*N_{ROT}*N_{BPSCS}(i_{SS})) \bmod N_{CBPSS}(i_{SS})$$

where $i_{SS}$ is a spatial stream index, $N_{BPSCS}(i_{SS})$ is a number of coded bits per symbol for an $i_{SS}$-th spatial stream, $N_{BPSCS}(i_{SS})$ is a number of coded bits per subcarrier for the $i_{SS}$-th spatial stream, $j=0, 1, \ldots, N_{CBPSS}(i_{SS})-1$, and f is an integer that varies based on the spatial stream index $i_{SS}$;

modulate the payload information of the PHY data unit according to the modulation scheme; and form a plurality of orthogonal frequency division multiplex (OFDM) symbols based on the modulated payload information.

14. The tangible, non-transitory, computer-readable medium of claim 13, wherein the computer-readable medium further stores instructions that, when executed by one or more processors, cause the one or more processors to:
select the parameter $N_{ROW}$ using the selected modulation scheme, wherein $N_{ROW}$ is the same for some modulation schemes.

15. The tangible, non-transitory, computer-readable medium of claim 13, wherein $N_{ROW}*N_{COL}=N^{Tone}*N_{BPSCS}(i_{SS})$ holds for all $i_{SS}$, where $N^{Tone}$ is a number of data tones, and where $N_{BPSCS}(i_{SS})$ is a number of coded bits per subcarrier for an $i_{SS}^{th}$ spatial stream.

16. The tangible, non-transitory, computer-readable medium of claim 13, wherein $N_{ROT}=(N^{Tone}/N_{SS})+C$, where $N^{Tone}$ is a number of data tones, and where C is either zero or a non-zero integer constant.

17. The tangible, non-transitory, computer-readable medium of claim 13, wherein f is an integer function of the spatial stream index $i_{SS}$ and the number of spatial streams $N_{SS}$.

* * * * *